W. I. OHMER & J. E. McALLISTER.
MACHINE FOR MAKING AND RECORDING CERTIFICATES AND THE LIKE.
APPLICATION FILED FEB. 24, 1912.
1,139,567.
Patented May 18, 1915.
23 SHEETS—SHEET 3.
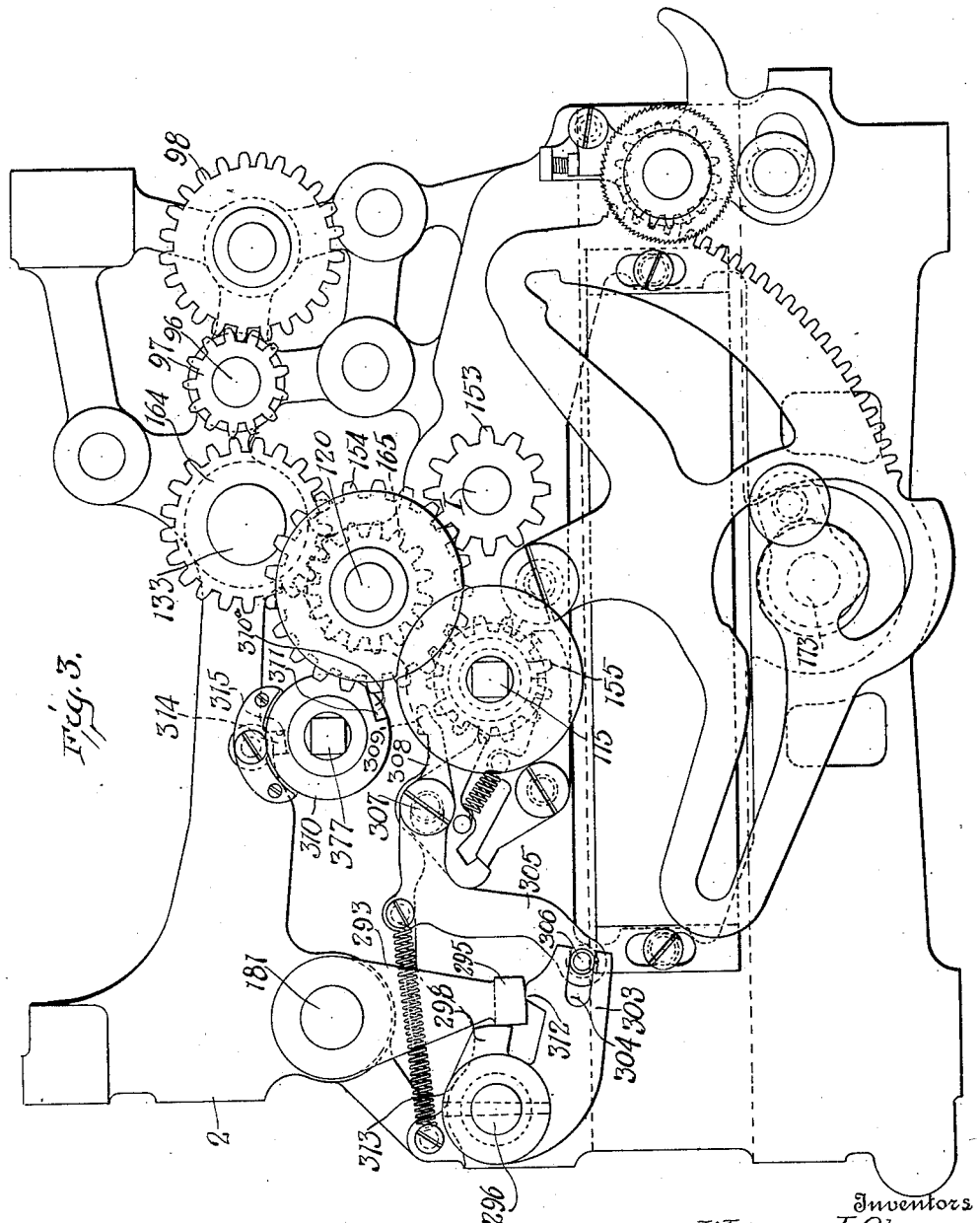

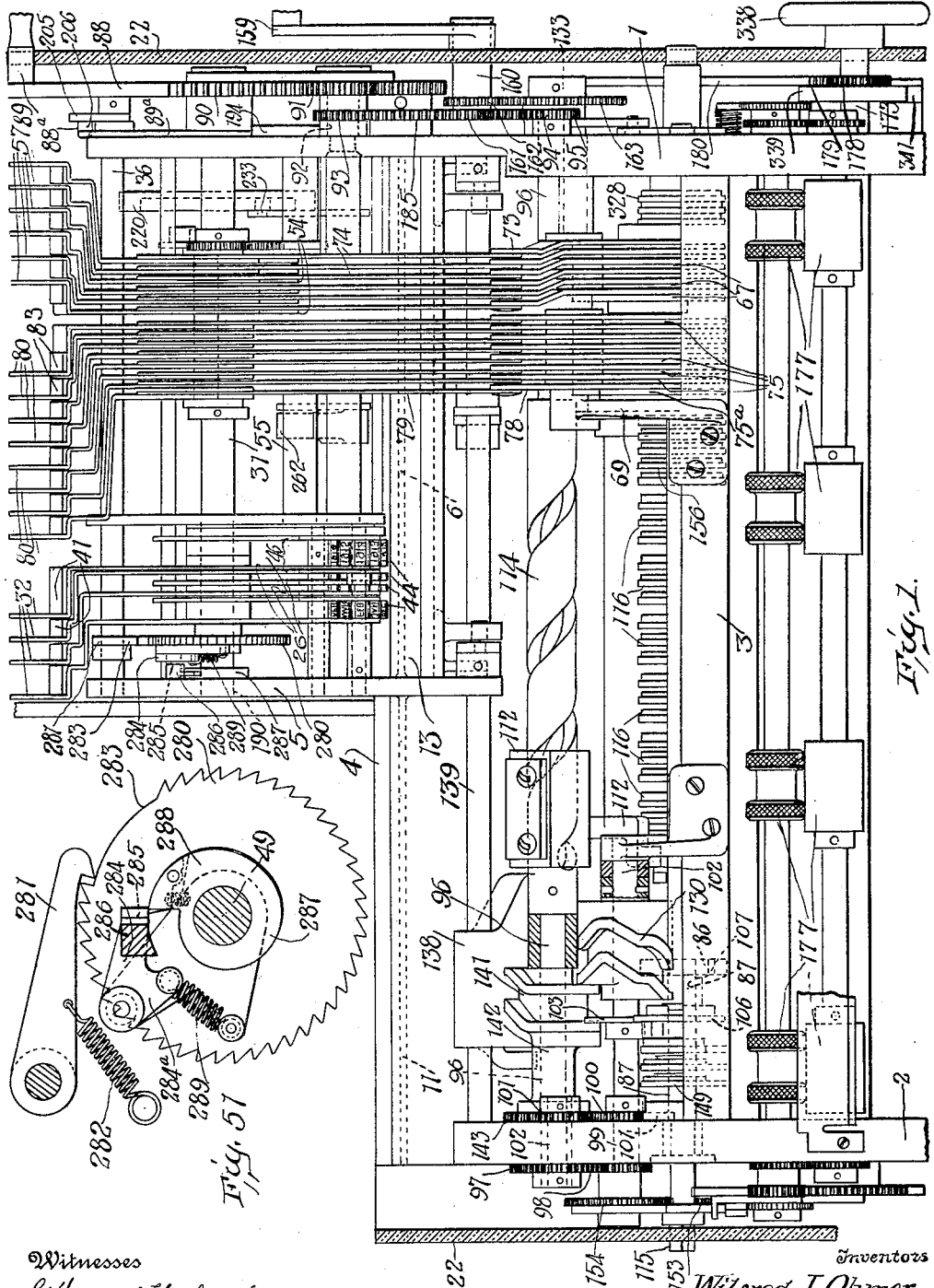

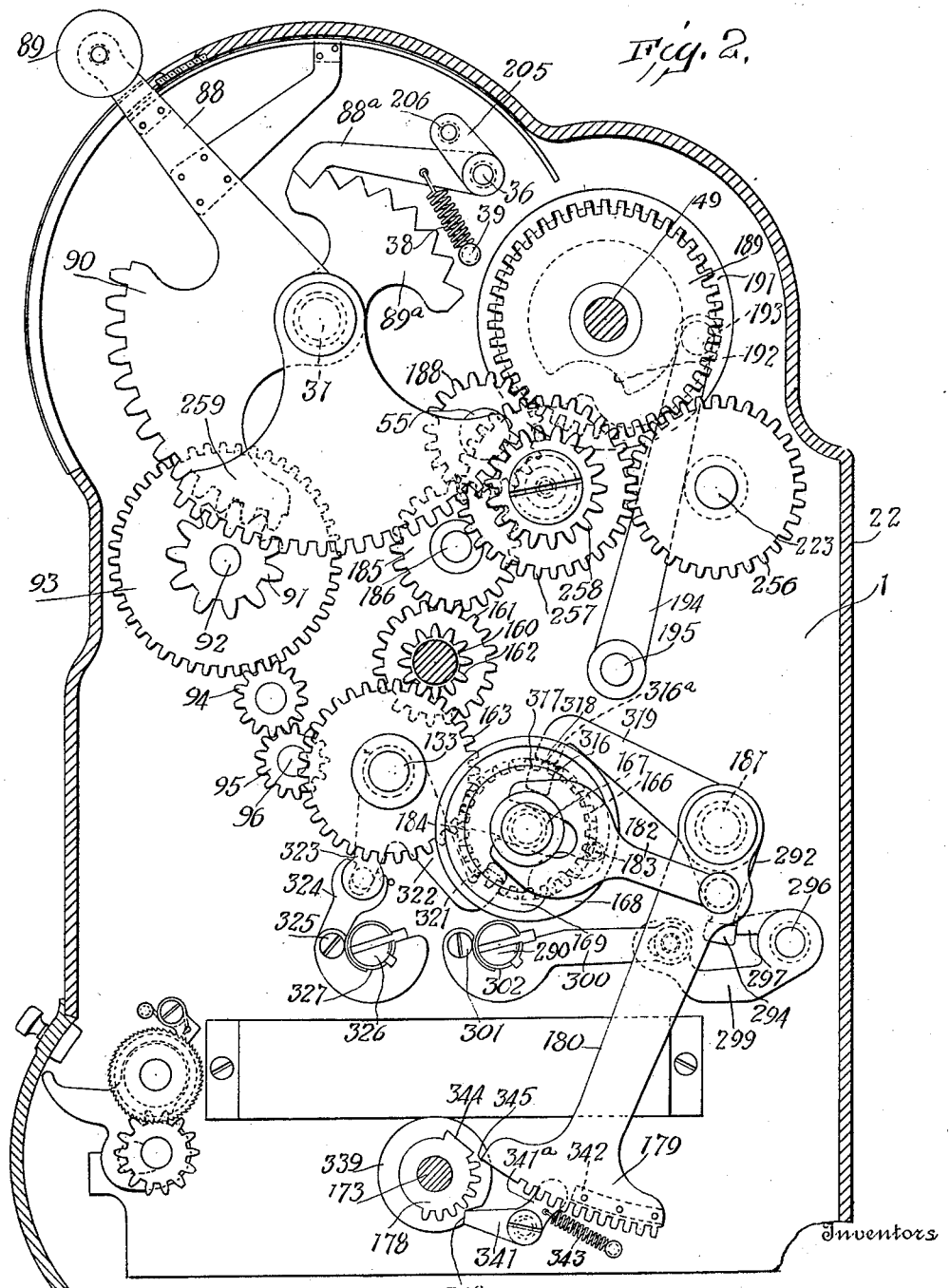

W. I. OHMER & J. E. McALLISTER.
MACHINE FOR MAKING AND RECORDING CERTIFICATES AND THE LIKE.
APPLICATION FILED FEB. 24, 1912.
1,139,567.
Patented May 18, 1915.
23 SHEETS—SHEET 4.
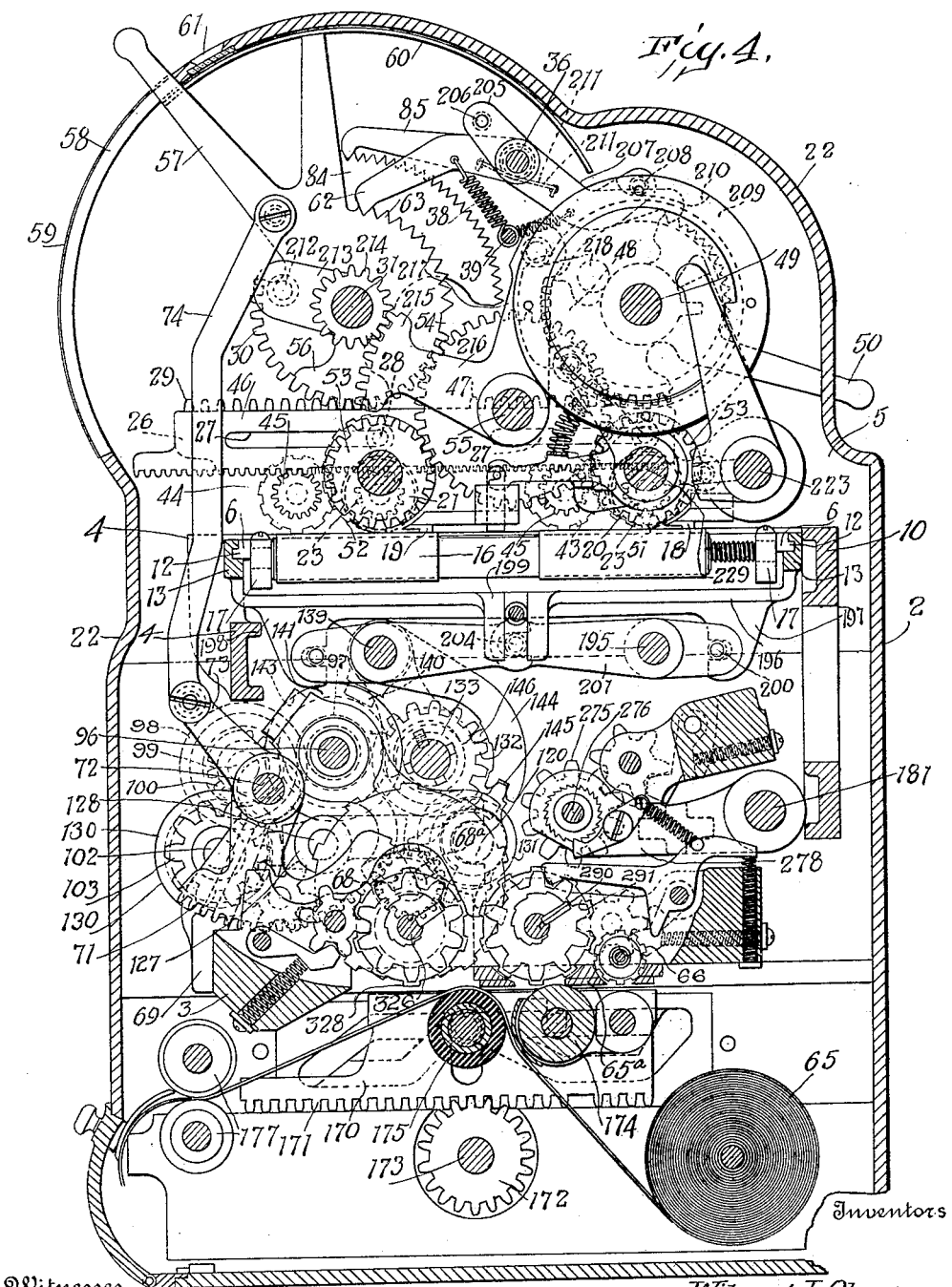

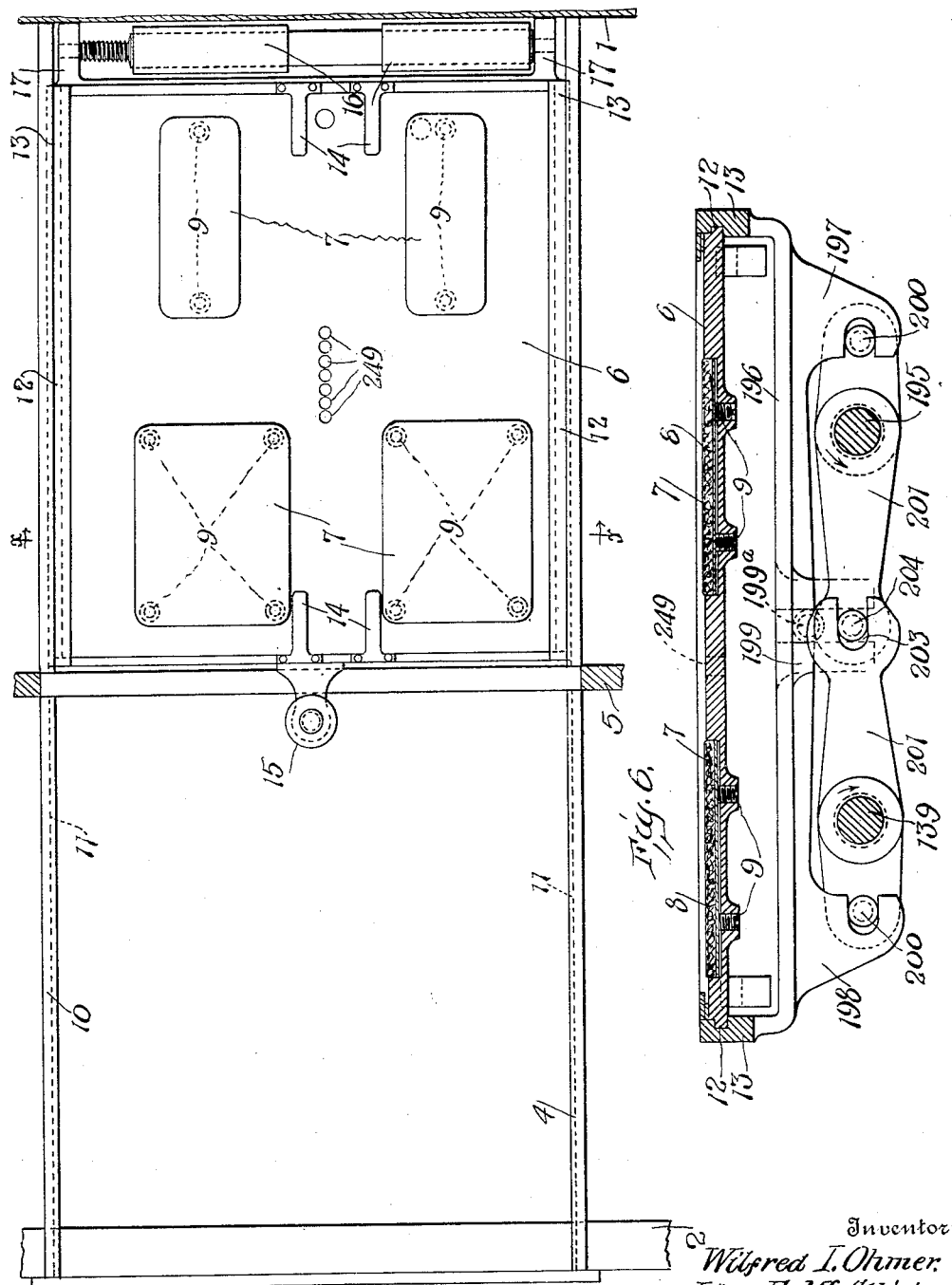

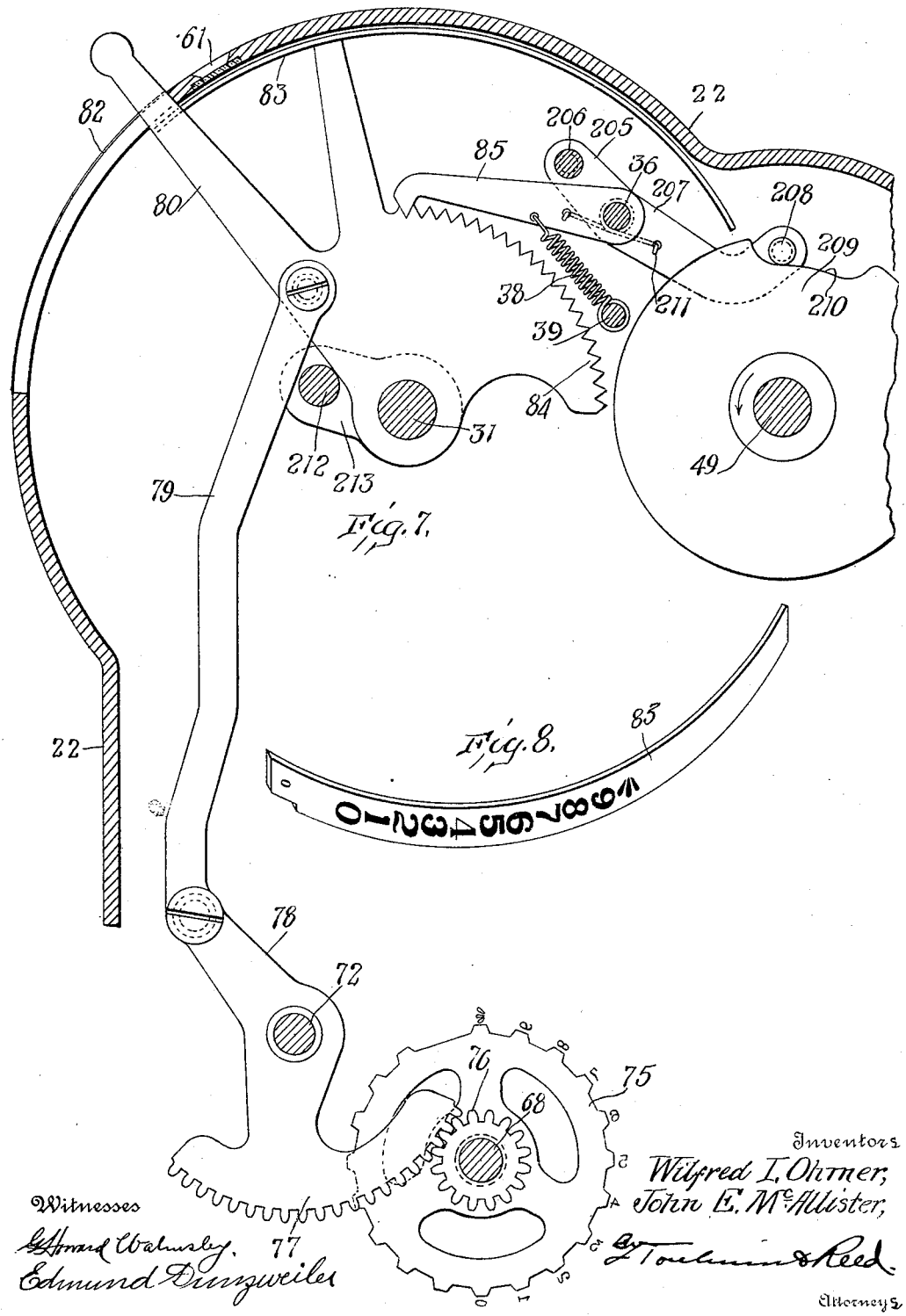

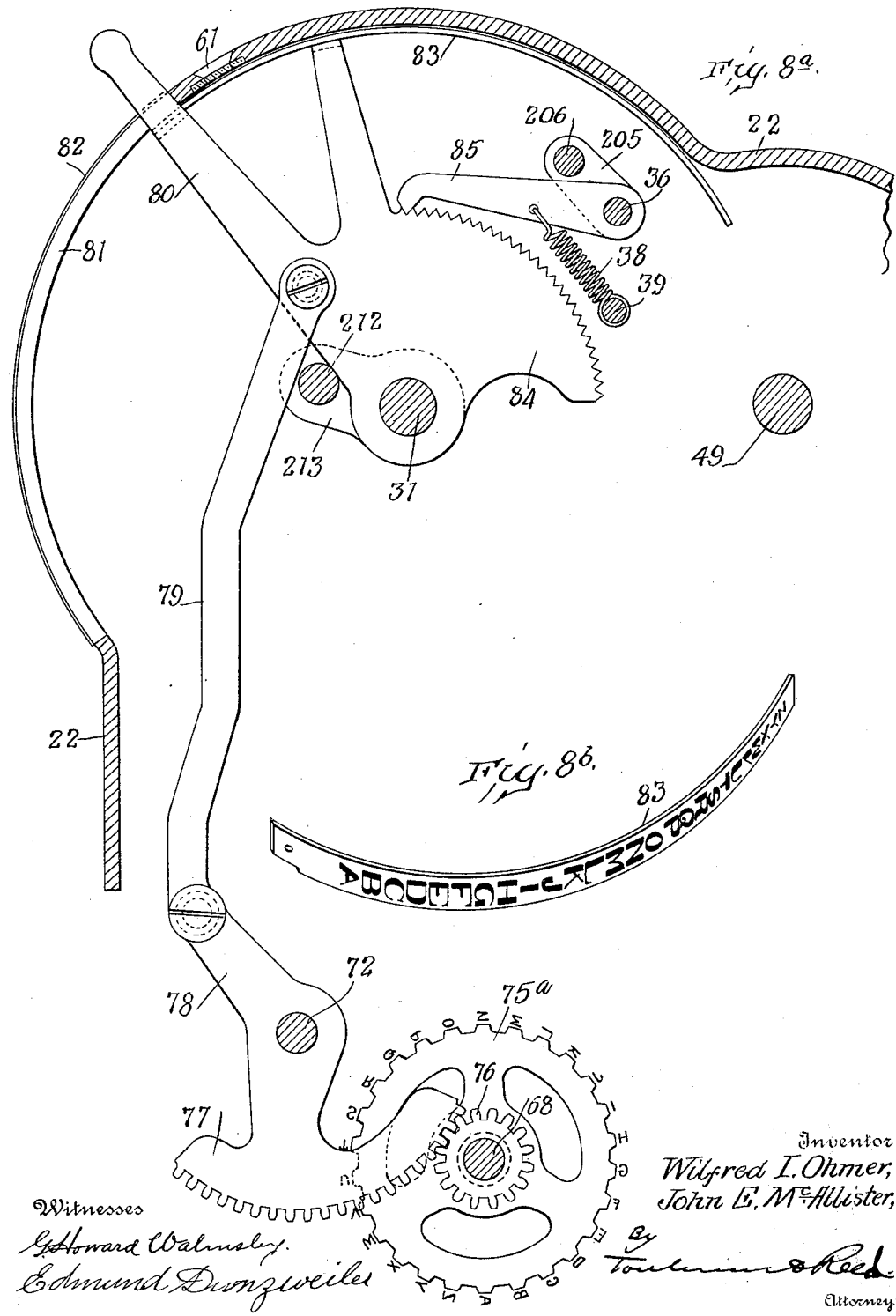

W. I. OHMER & J. E. McALLISTER.
MACHINE FOR MAKING AND RECORDING CERTIFICATES AND THE LIKE.
APPLICATION FILED FEB. 24, 1912.
1,139,567.
Patented May 18, 1915.
23 SHEETS—SHEET 8.
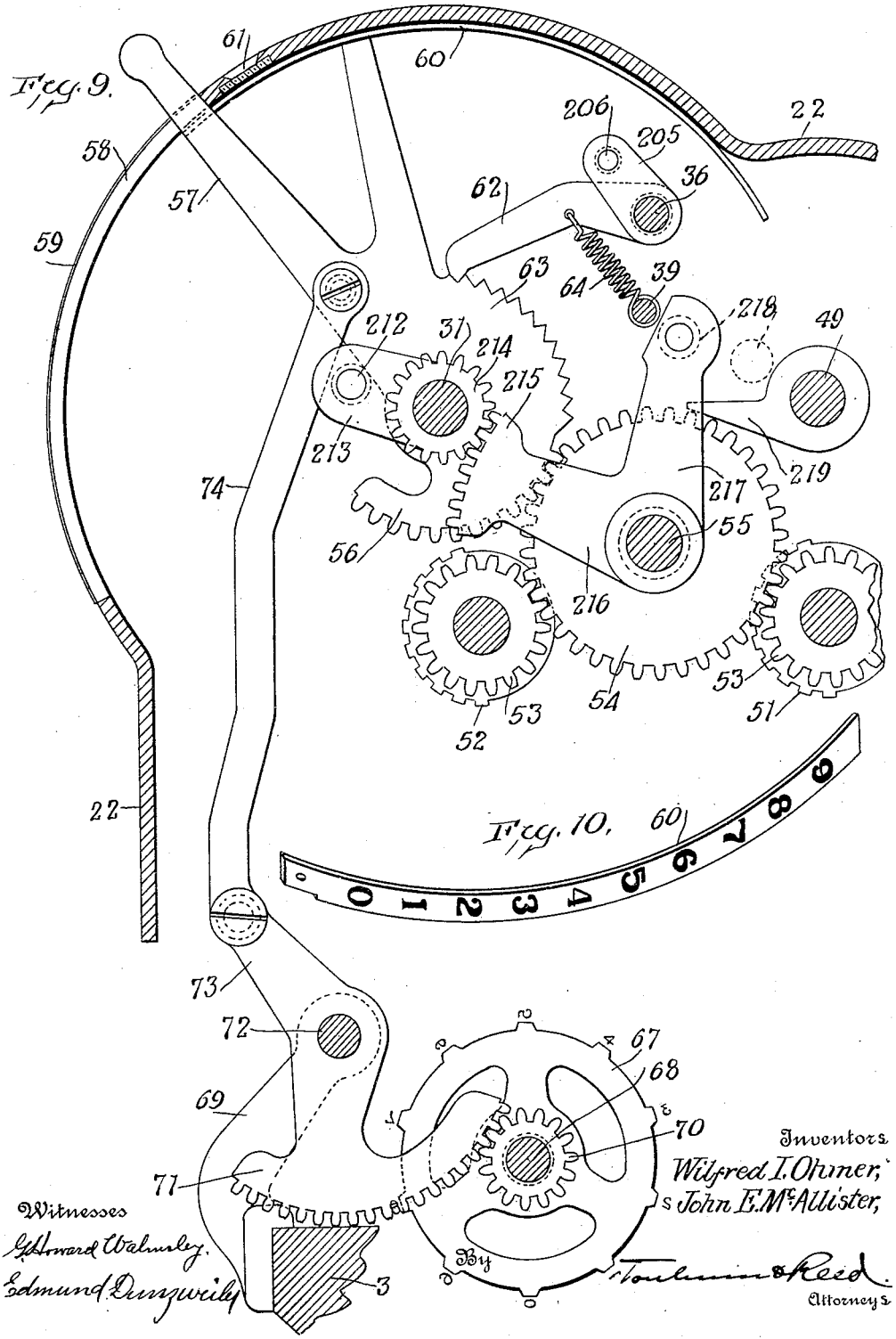

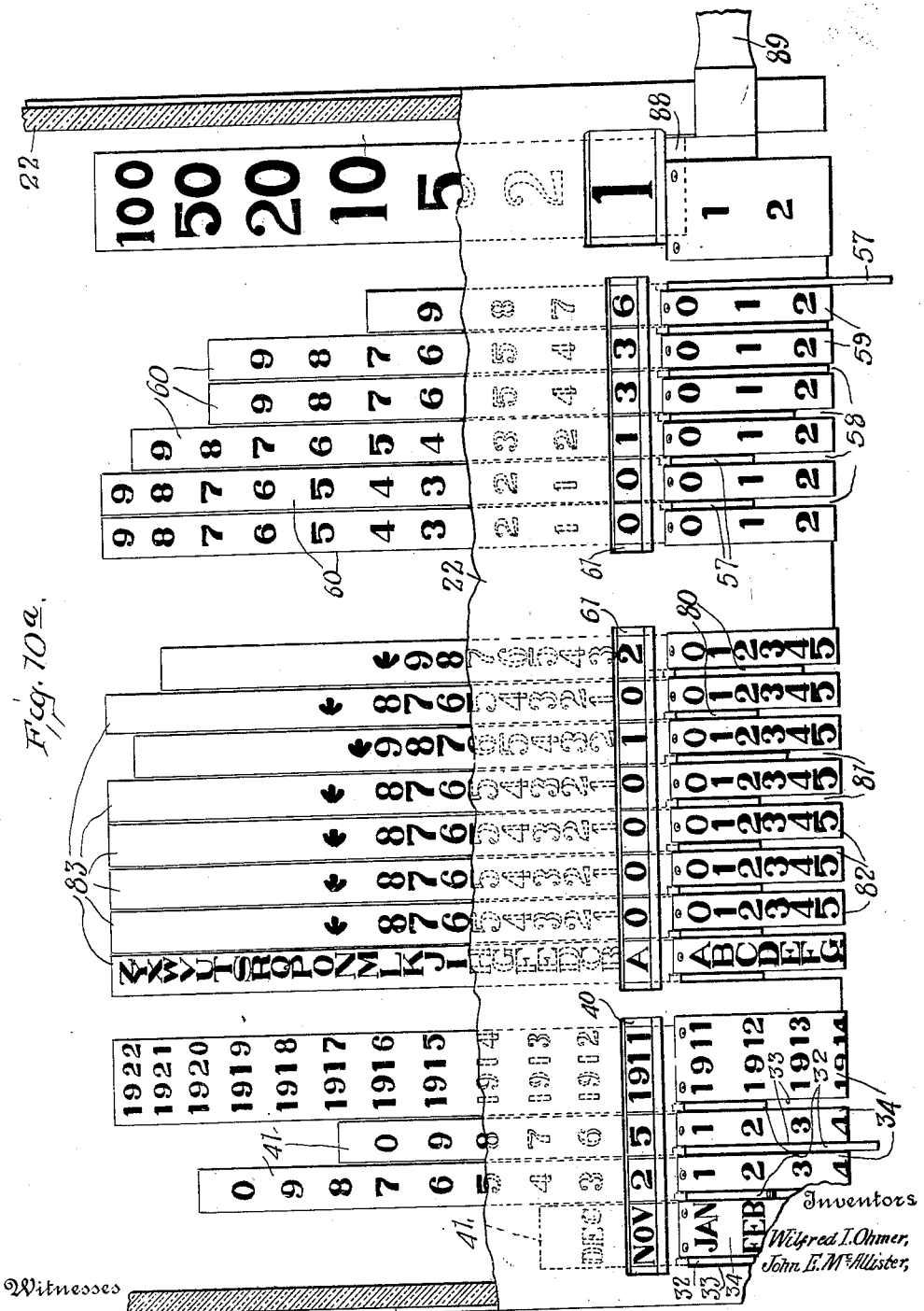

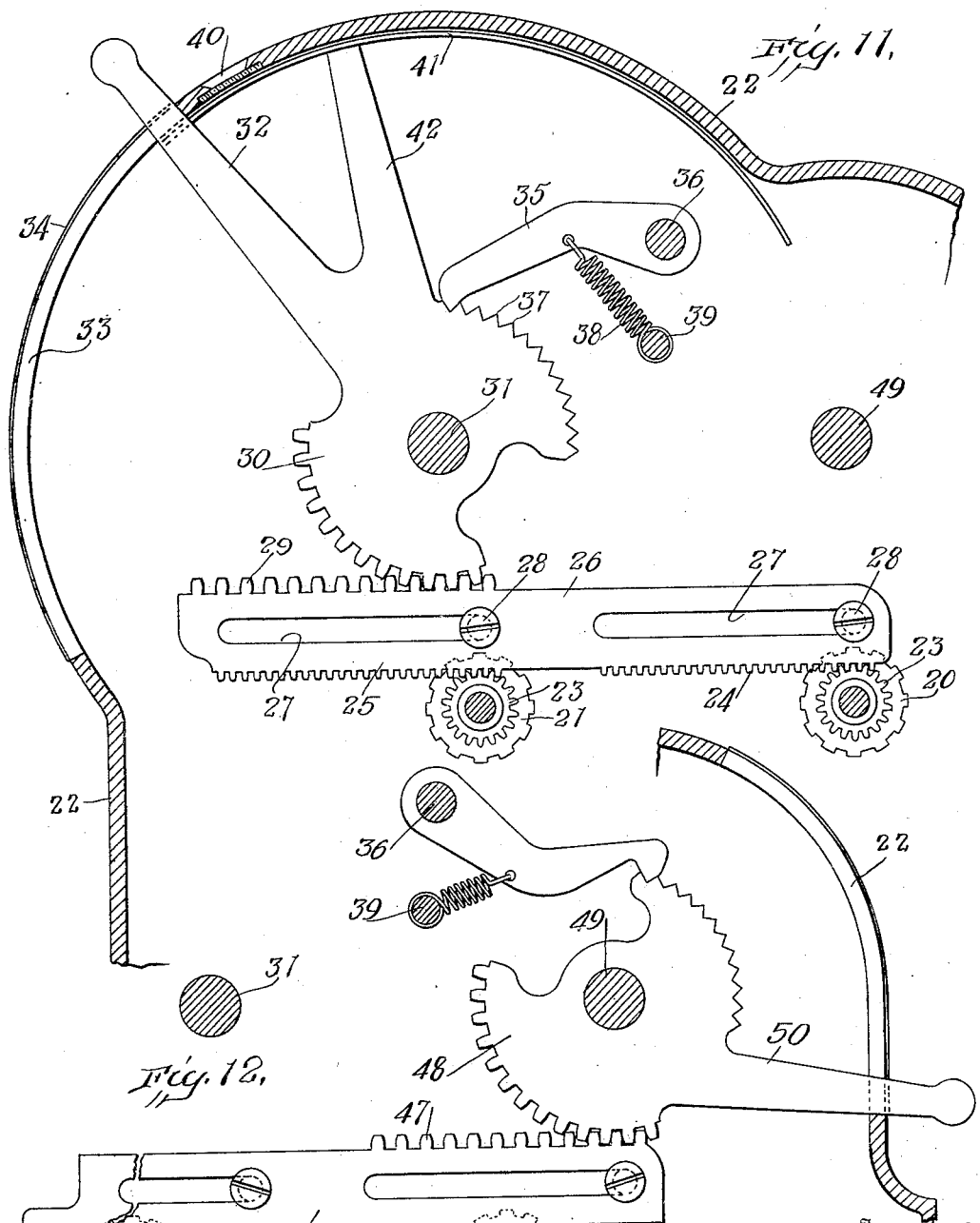

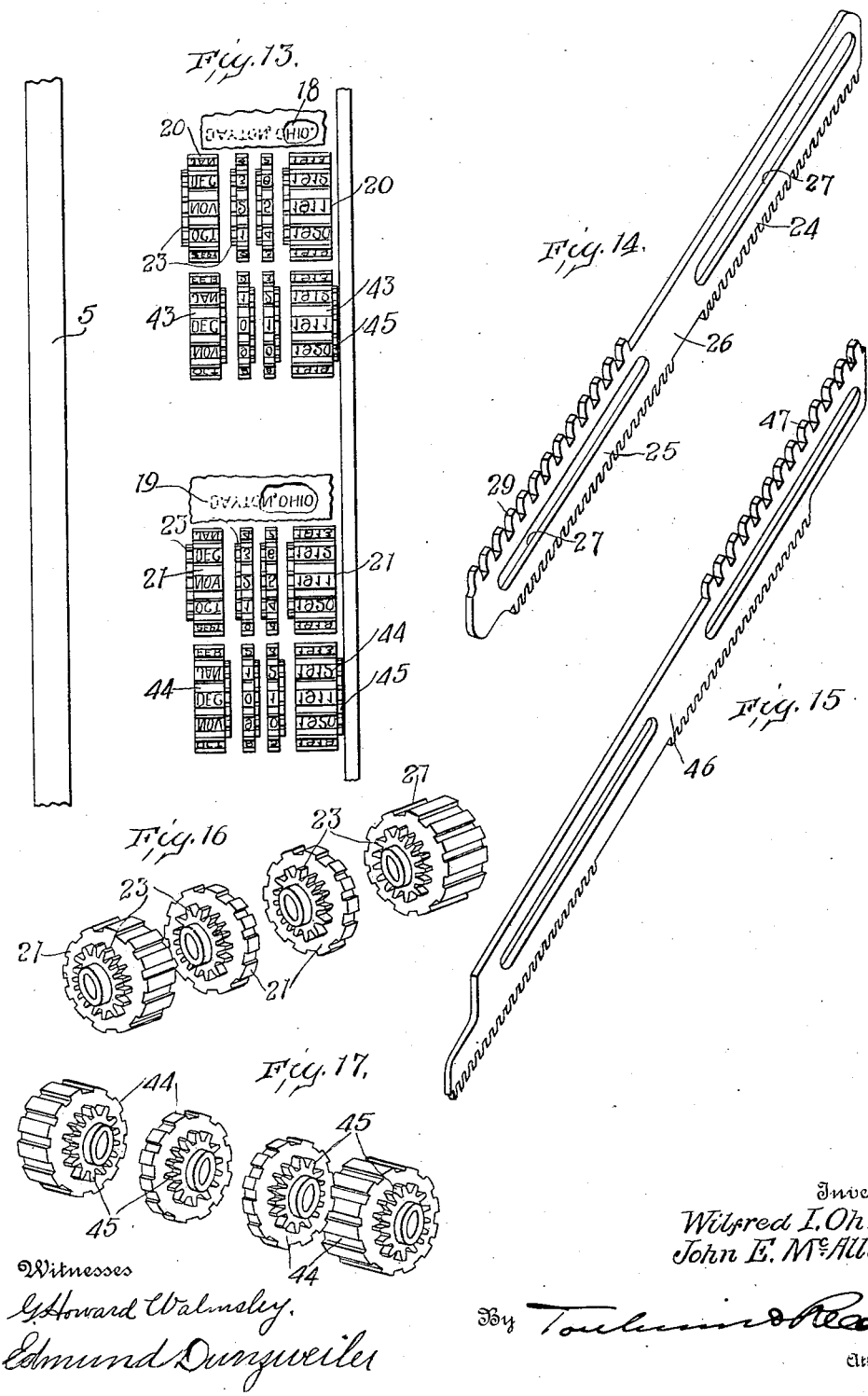

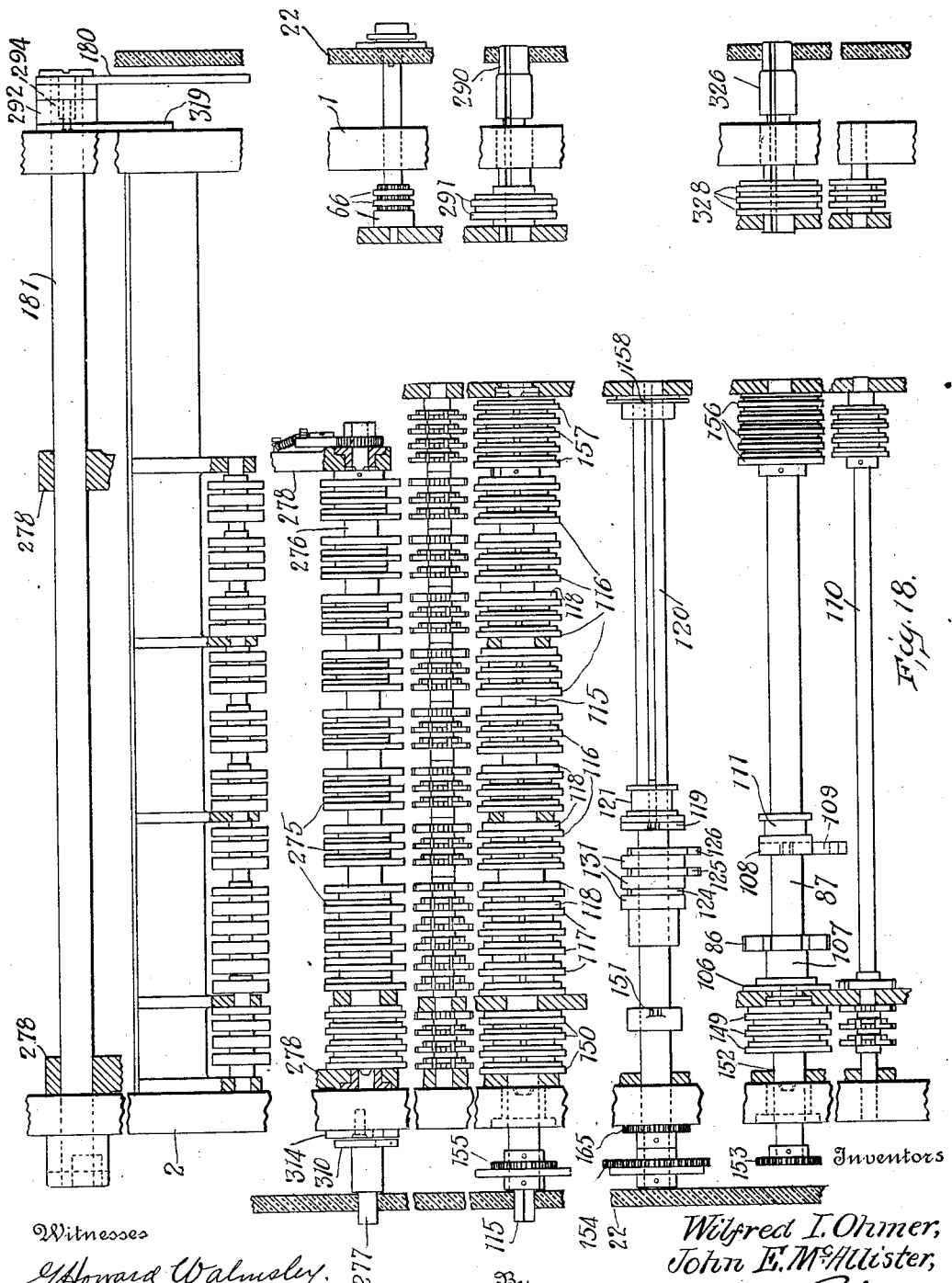

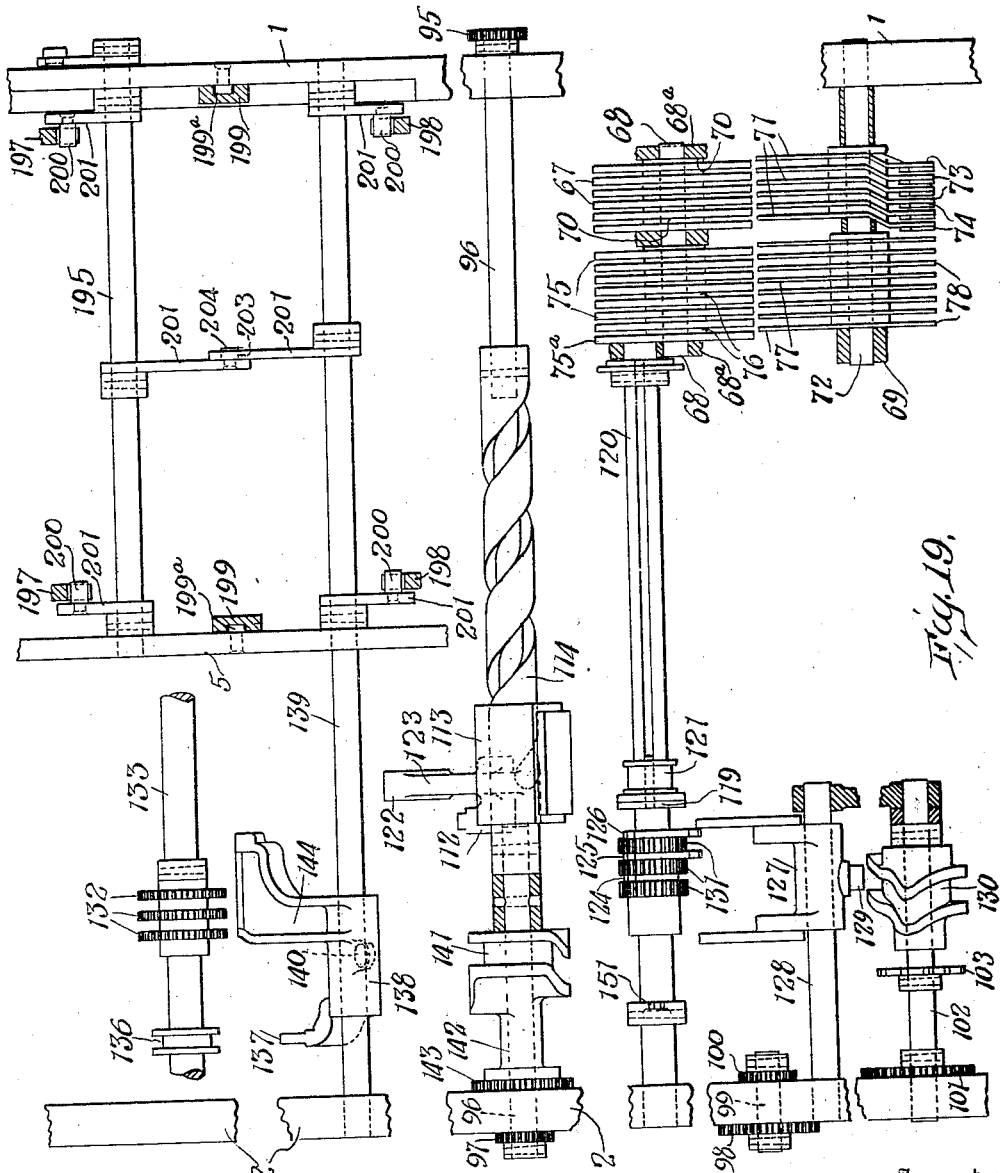

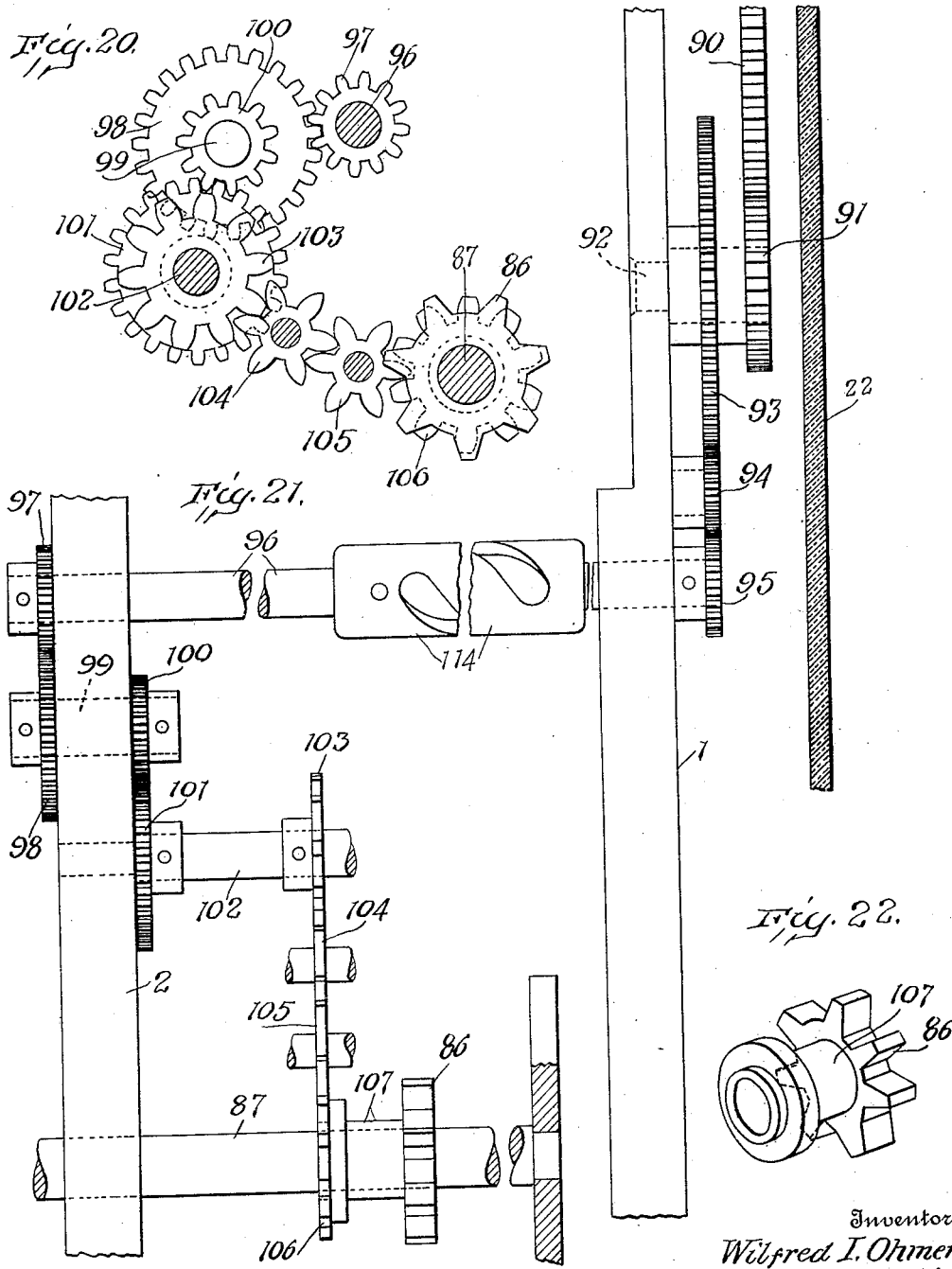

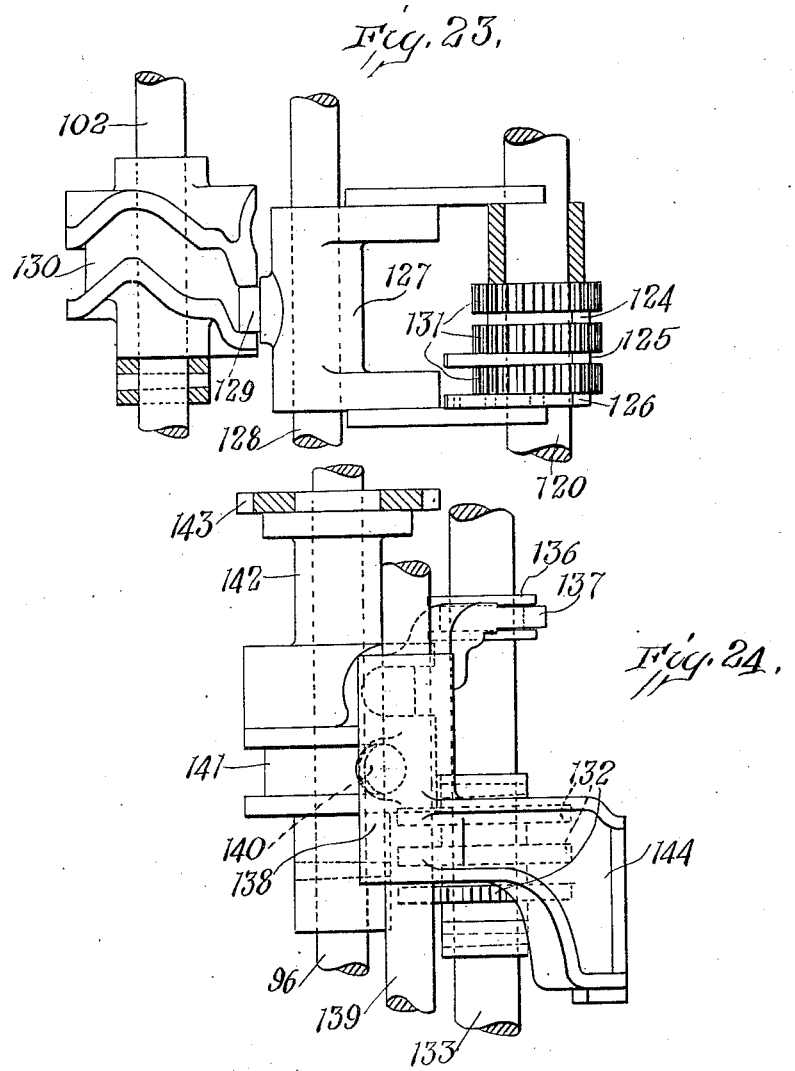

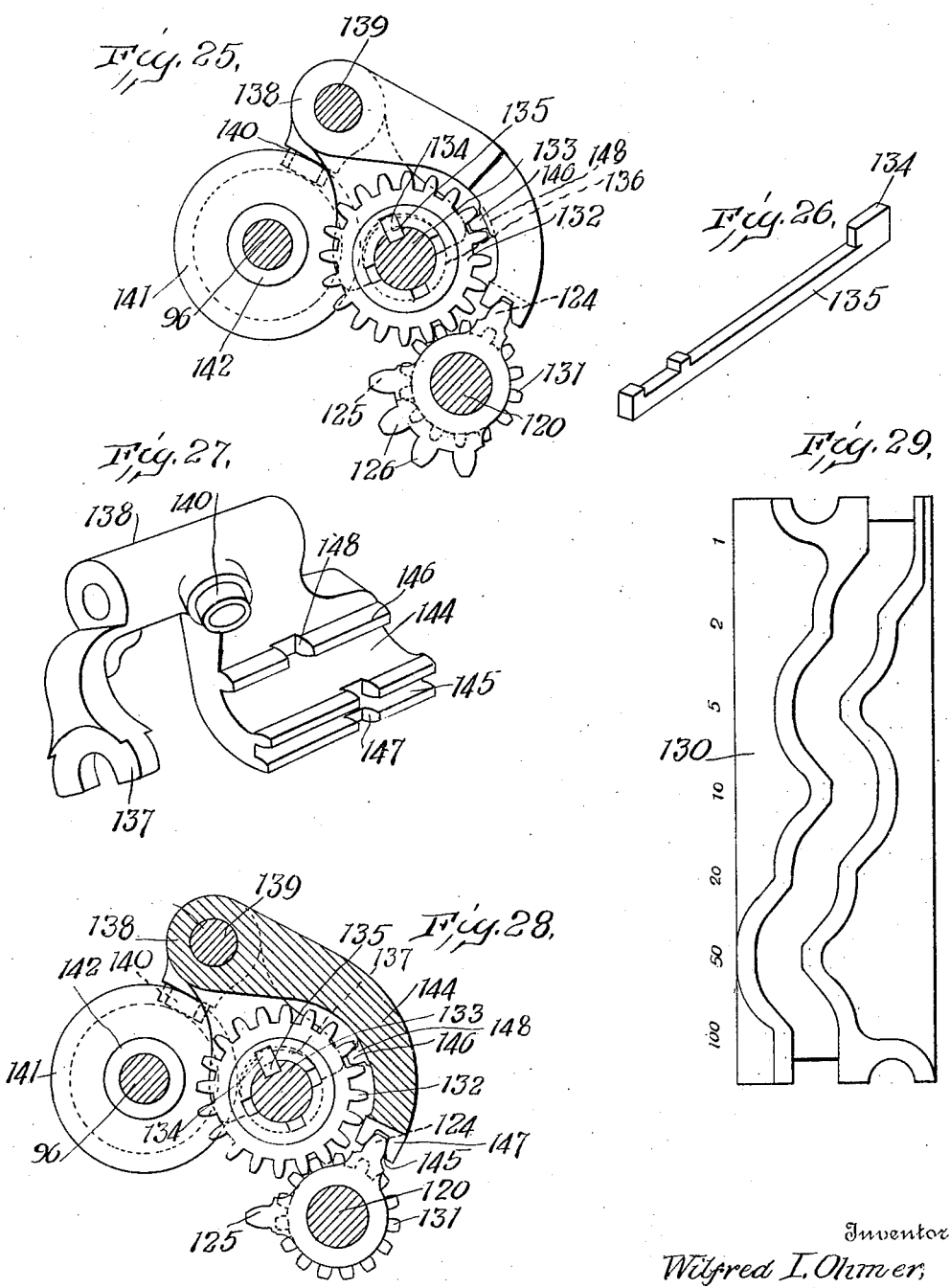

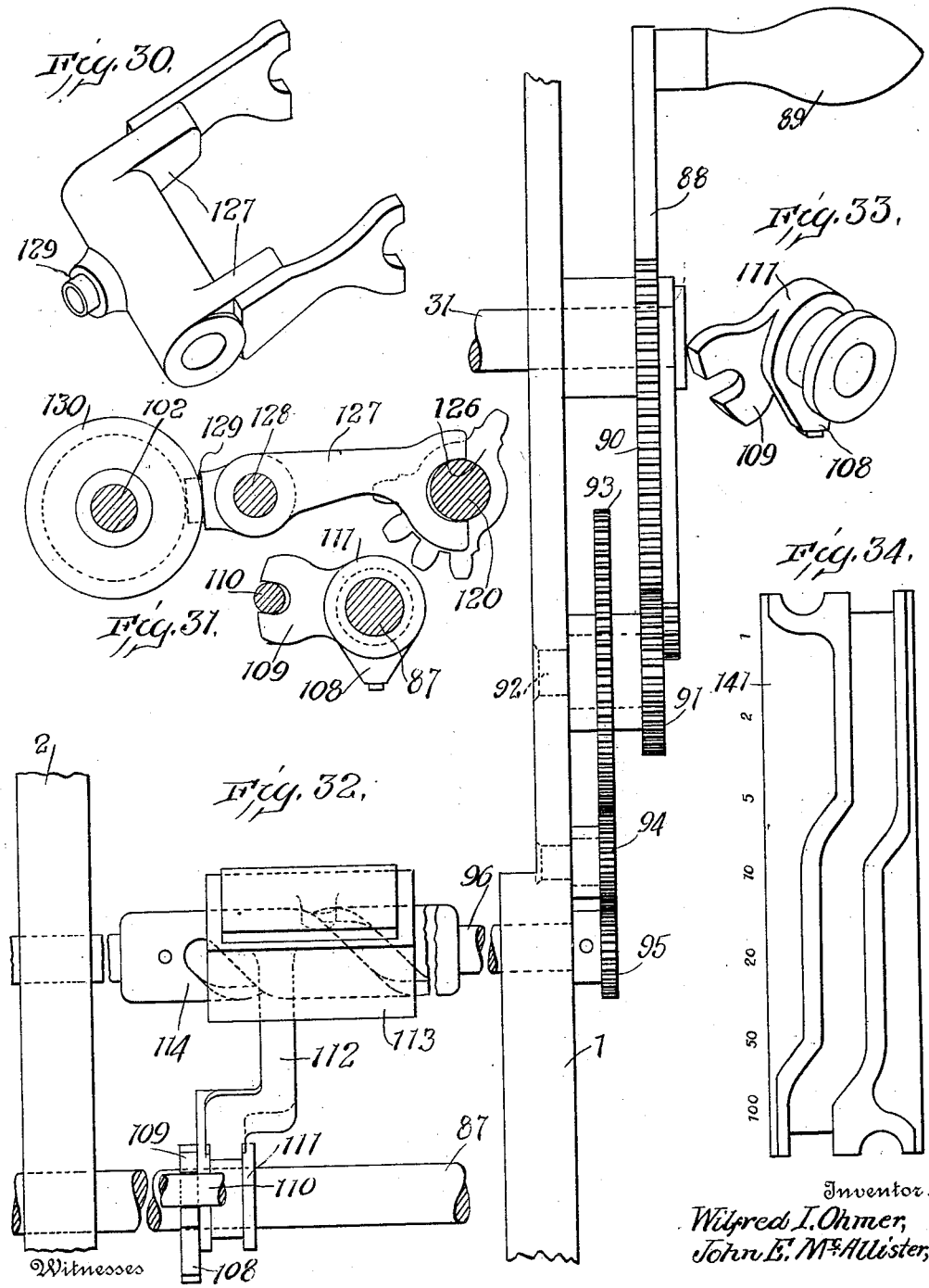
W. I. OHMER & J. E. McALLISTER.
MACHINE FOR MAKING AND RECORDING CERTIFICATES AND THE LIKE.
APPLICATION FILED FEB. 24, 1912.
1,139,567.
Patented May 18, 1915.
23 SHEETS—SHEET 17.

W. I. OHMER & J. E. McALLISTER.
MACHINE FOR MAKING AND RECORDING CERTIFICATES AND THE LIKE.
APPLICATION FILED FEB. 24, 1912.
1,139,567.
Patented May 18, 1915.
23 SHEETS—SHEET 18.
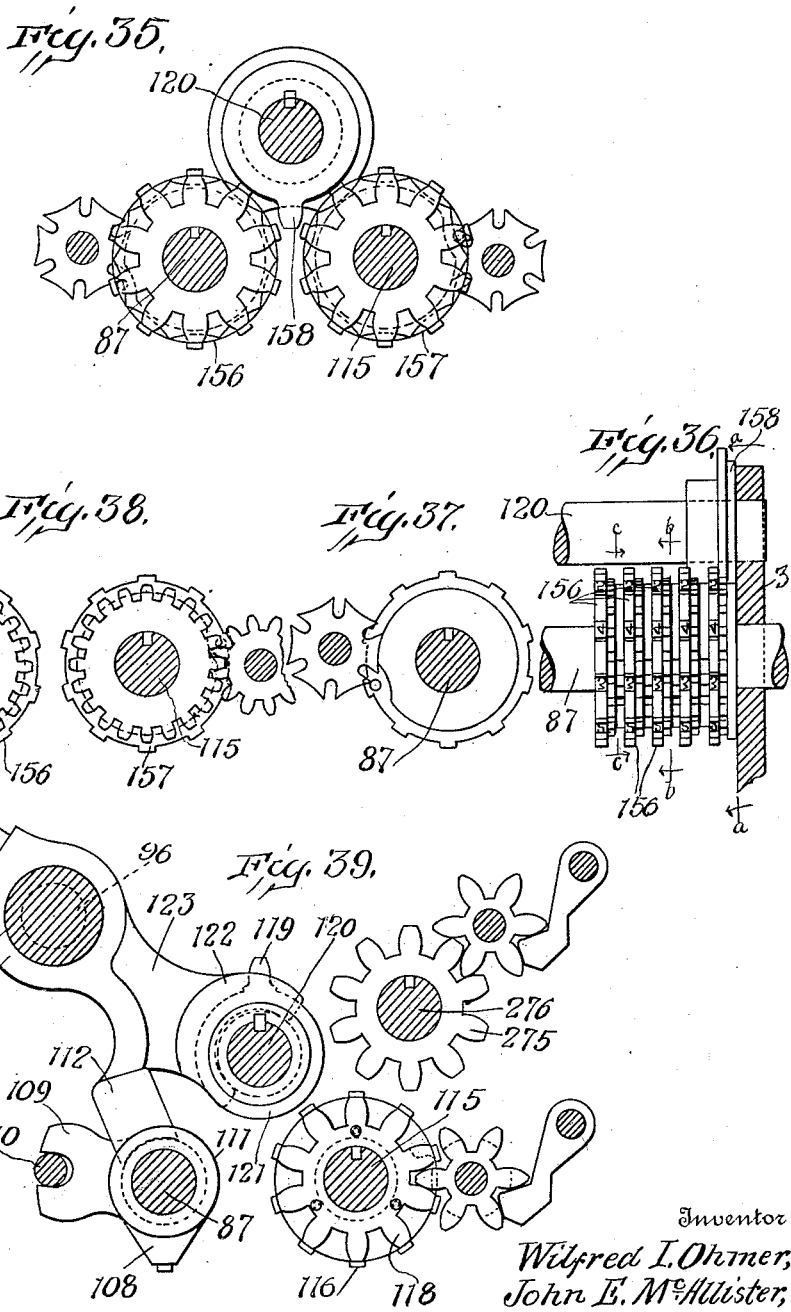

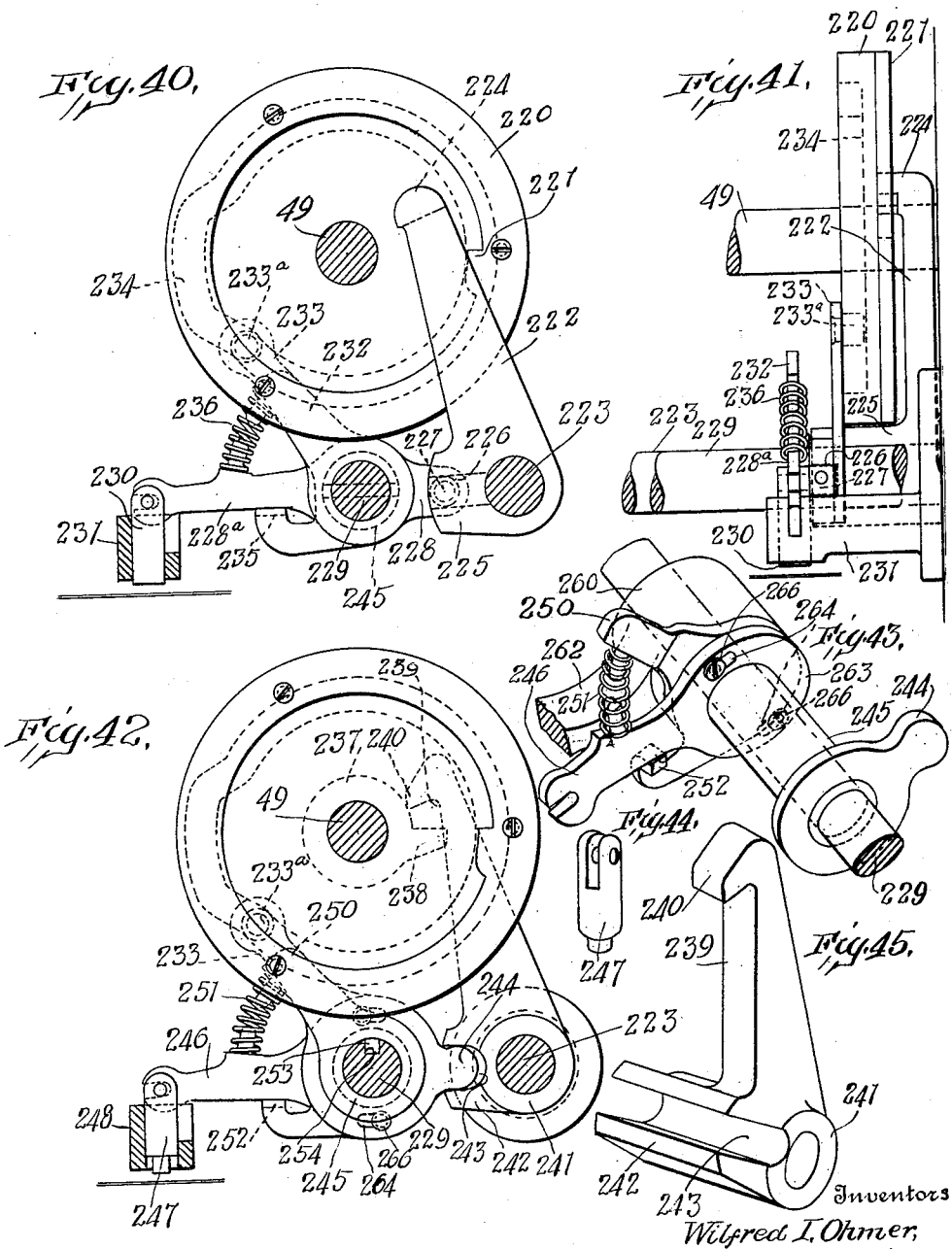

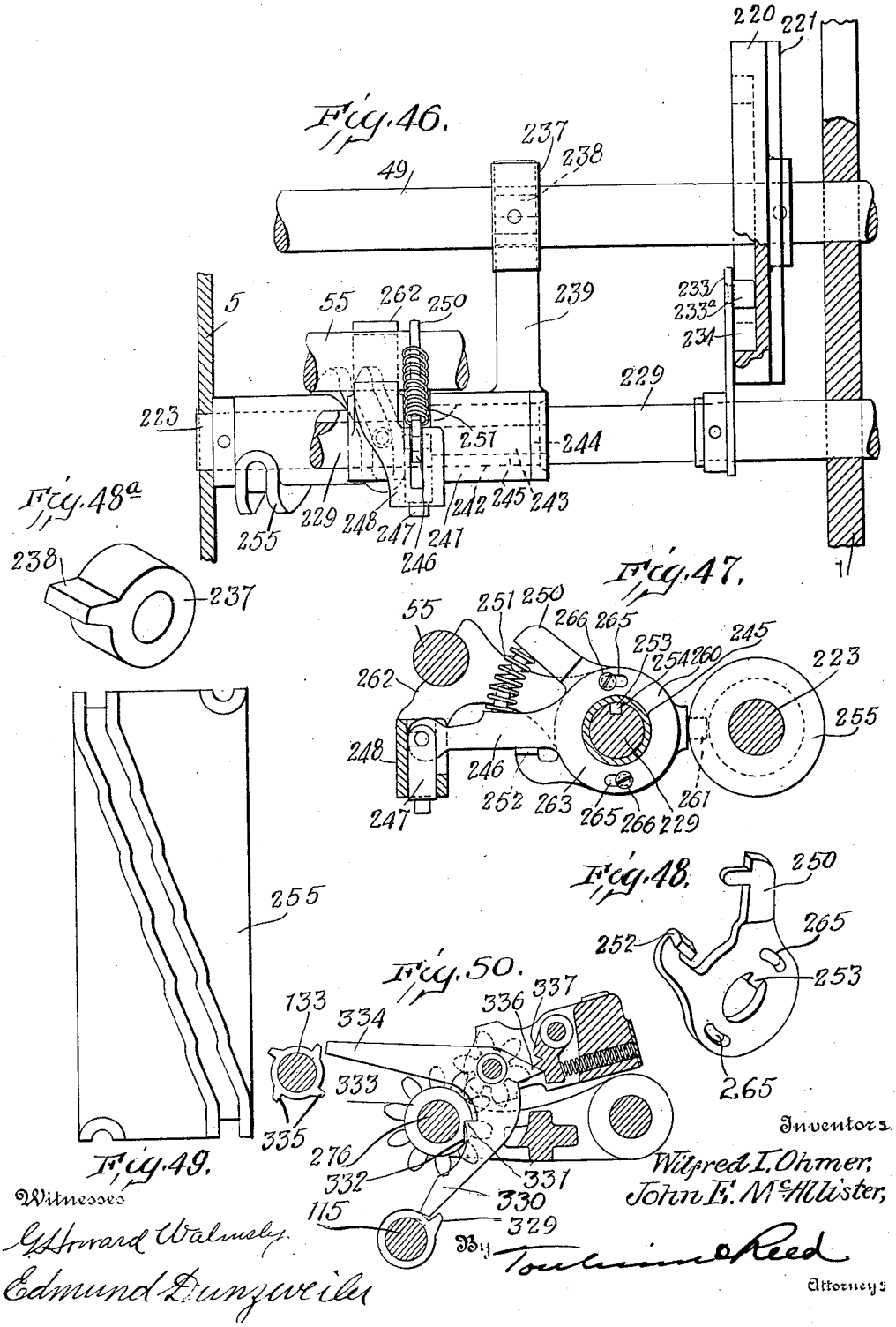

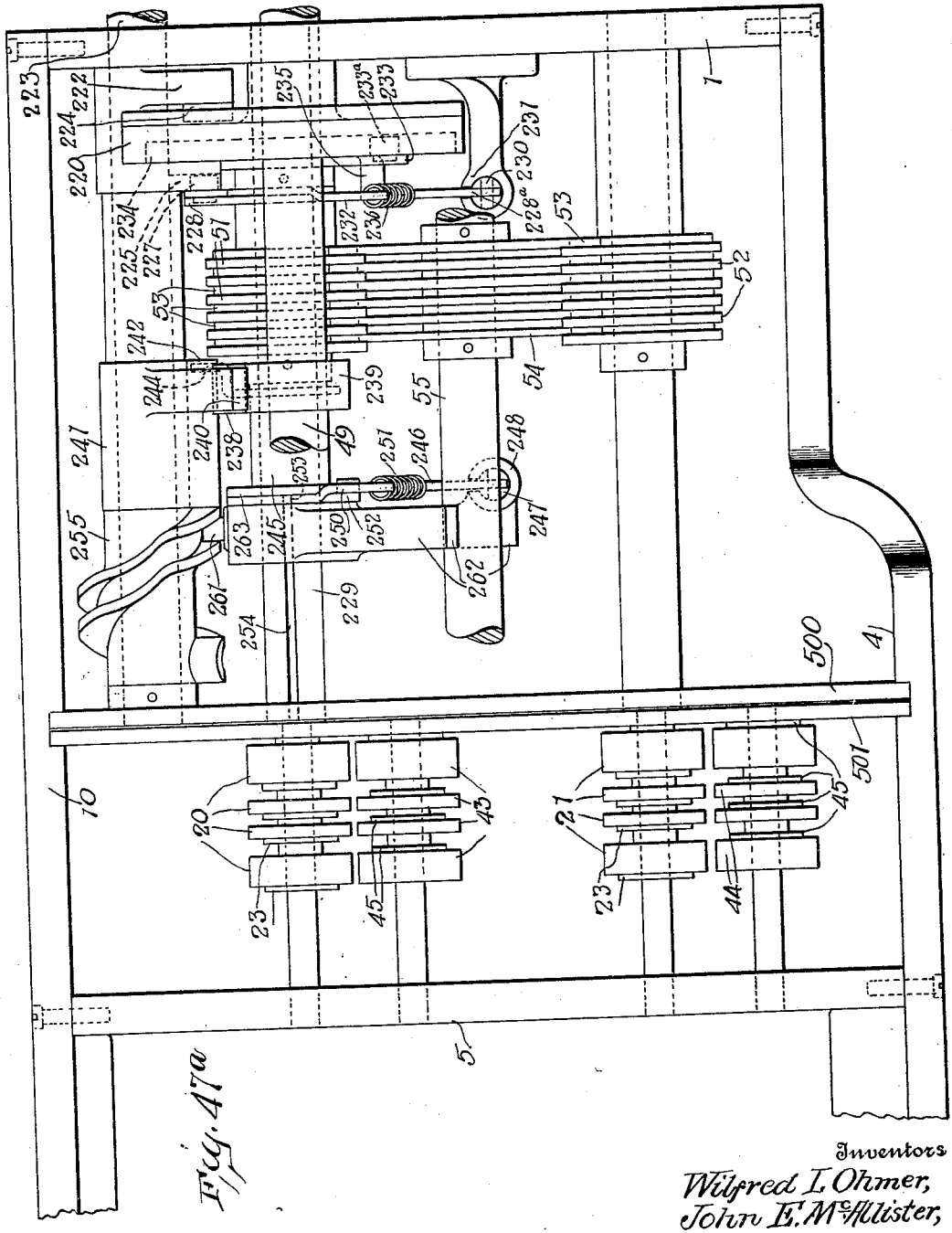

W. I. OHMER & J. E. McALLISTER.
MACHINE FOR MAKING AND RECORDING CERTIFICATES AND THE LIKE.
APPLICATION FILED FEB. 24, 1912.
Patented May 18, 1915.
23 SHEETS—SHEET 22.
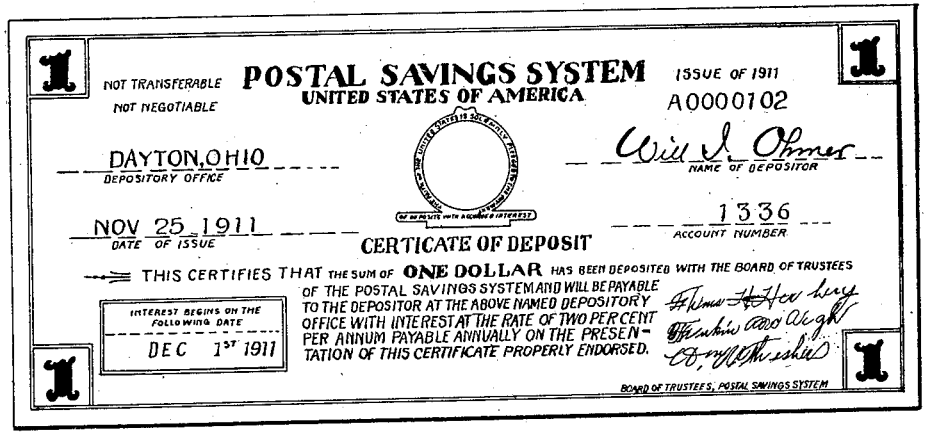
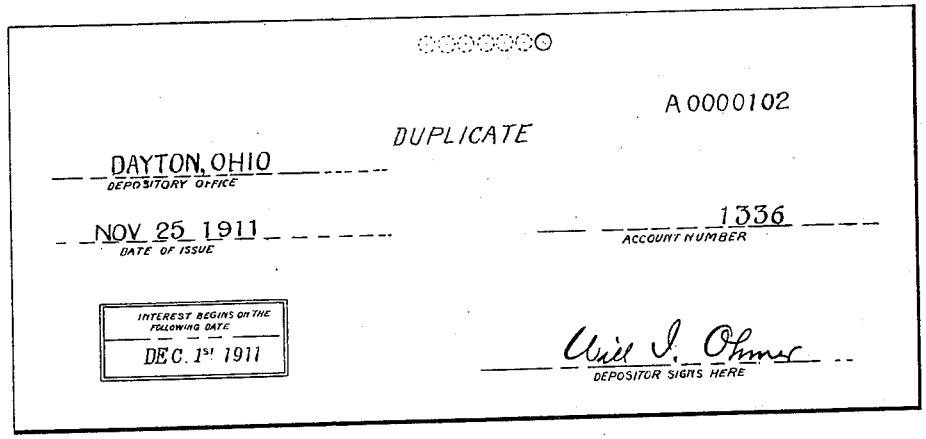

Fig. 53.

UNITED STATES PATENT OFFICE.

WILFRED I. OHMER AND JOHN E. McALLISTER, OF DAYTON, OHIO, ASSIGNORS TO THE RECORDING AND COMPUTING MACHINES COMPANY, OF DAYTON, OHIO, A CORPORATION OF OHIO.

MACHINE FOR MAKING AND RECORDING CERTIFICATES AND THE LIKE.

1,139,567.   Specification of Letters Patent.   Patented May 18, 1915.

Application filed February 24, 1912. Serial No. 679,659.

*To all whom it may concern:*

Be it known that we, WILFRED I. OHMER and JOHN E. McALLISTER, citizens of the United States, residing at Dayton, in the county of Montgomery and State of Ohio, have invented certain new and useful Improvements in Machines for Making and Recording Certificates and the like, of which the following is a specification, reference being had therein to the accompanying drawing.

This invention relates to a machine for making and recording certificates and the like, and is designed more particularly for use in banks and other institutions which issue certificates of deposit and similar instruments in large numbers. The object of the invention is to provide a machine which will make certificates, each differing from the others in some respect, will produce a removable record of various items relating to each certificate and will also compute and record the totals of such of those items as relate to data, the total of which is desired.

To accomplish this result it is a further object of the invention to produce a machine which will print upon each certificate issued data peculiar to that certificate; which will print the same data on a duplicate of the certificate; which will print this same data, or portions thereof, upon a record sheet; and which will also print on said record sheet, at the will of the operator, the totals of such parts of such data as it may be desired to totalize.

The invention also involves the production of a simple and positive device to compute the various amounts for which certificates have been issued, and further, the provision of means to prevent the machine from being operated in the absence of a certificate of some kind or when the certificate inserted does not correspond to the amount which the machine is set to record, thereby insuring an accurate record of the certificates issued.

It is also an object of the invention to so construct and organize the machine as a whole that it will be of a simple, compact arrangement easily operated and will not be likely to become disarranged or to be rendered inoperative.

In the accompanying drawings, Figure 1 is a front elevation of a machine embodying the invention with the outer casing in section; Fig. 2 is an elevation of one end of the machine with the casing removed; Fig. 3 is an elevation of the opposite end of the machine; Fig. 4 is a vertical section, taken just inside the end member of the frame at one end of the machine and looking inward; Fig. 5 is a plan view of the certificate carrier and its guide; Fig. 6 is a section taken on the lines $x\ x$ of Fig. 5 and looking in the direction of the arrows; Fig. 7 is a sectional view showing the mechanism for setting the printing devices to print the certificate number; Fig. 8 is a detail view of the indicator connected with the setting mechanism to indicate the position of the certificate number printing mechanism; Fig. $8^a$ is a view similar to Fig. 7 and showing the mechanism for printing the alphabetical prefix to the certificate number; Fig. $8^b$ is similar to Fig. 8 showing the indicator carrying the letters of the alphabet; Fig. 9 is a sectional view showing the mechanism for printing the account number on the certificate and on the record; Fig. 10 is a detail of the indicator connected with the setting mechanism to indicate the position of the account number printing devices; Fig. $10^a$ is a plan, partly broken away, of the setting mechanisms showing the double indicators therefor; Fig. 11 is a section showing the mechanism for setting the printing devices to print the date of issue on the certificate and on the duplicate of the statement; Fig. 12 is a section showing the mechanism for setting the printing devices to print on the certificate and the duplicate the date on which the interest begins to run; Fig. 13 is a plan view of the date printing devices for both the certificate and duplicate; Figs. 14 and 15 are detail views of the operating racks for setting these printing devices; Fig. 16 and 17 are detail views of the date printing wheels; Fig. 18 is a diagrammatical plan view of the record computing and printing devices, showing the several parts of the devices separated; Fig. 19 is a diagrammatical elevation of the denomination printing and computing devices showing the several parts of the mechanism separated; Fig. 20 is a section showing in elevation the gearing for setting the denomination printing device; Fig. 21 is a fragmental elevation showing the mechanism for setting the denomination printing devices; Fig. 22 is a detail of said denomination printing devices; Fig. 23 is a plan of the shifting mechanism for the actuators for the total cash counters; Fig. 24 is a plan view of the locking mechanism for said actuating device; Fig. 25 is a section showing in elevation said actuating device and said locking mechanism; Fig. 26 is a detail of the key forming a part of said locking mechanism; Fig. 27 is a detail of the locking member forming a part of said locking mechanism; Fig. 28 is a sectional view of the locking mechanism showing the same in operative relation with one of the actuating devices for the total cash computing mechanism; Fig. 29 is a development of the cam for setting said actuating devices; Fig. 30 is a detail of the shifting yoke forming a part of said actuating mechanism; Fig. 31 is a section showing the shifting mechanism for the total cash actuating device in elevation; Fig. 32 is a fragmental elevation showing the device for printing on the record the number of certificates issued and means for setting the same; Fig. 33 is a detail of the printing device shown in Fig. 32; Fig. 34 is a development of the cam for controlling the locking mechanism for the total cash actuating device; Fig. 35 is a sectional detail of the grand total counter of the certificates issued taken on the line $a\ a$ of Fig. 36; Fig. 36 is an elevation of said grand total printing counter; Fig. 37 is a section taken on the line $c\ c$ of Fig. 36 and looking in the direction of the arrows and showing one countershaft; Fig. 38 is a section taken on the line $b\ b$ of Fig. 36 and looking in the direction of the arrows and showing both countershafts; Fig. 39 is a section showing in elevation the mechanism for recording and printing the number of certificates of any denomination issued; Fig. 40 is a section showing in elevation the device for locking the machine against operation if no certificate is inserted; Fig. 41 is an elevation of the same; Fig. 42 is a section showing in elevation a device for locking the machine against operation if the machine has been set to record a certificate of a different denomination from that of the certificate inserted; Fig. 43 is a detail of the adjustable actuating arm forming a part of the feeler of said locking device; Fig. 44 is a detail of the plunger forming a part of said feeler; Fig. 45 is a detail of the locking member and its grooved actuating hub; Fig. 46 is an elevation of the certificate-controlled locking device of Fig. 42; Fig. 47 is a detail of the actuating mechanism for said locking device; Fig. 47ª is a plan of the locking mechanisms; Fig. 48 is a detail of one of the actuating levers forming a part of said mechanism; Fig. 48ª is a detail of one member of said locking device; Fig. 49 is a development of the cam forming a part of said operating mechanism; Fig. 50 is a detail of the lock to hold the accumulator against downward movement until the total counters have been reset to zero; Fig. 51, Sheet 1 is a detail of the lock for the operating shaft; Fig. 52 is a facsimile of the certificate and the duplicate; and Fig. 53 is a portion of a record produced by the machine and showing two daily records and an inspector's total record.

In these drawings, for the purpose of illustration, the invention has been shown as embodied in a machine designed for the use of the postal savings banks as organized under the postal savings system of the Post Office Department and the certificate issued corresponds in its general features, at least, to the certificate of deposit issued by such savings banks and the records are records of the data relating to such certificates. It will be understood, however, that the invention is not limited to postal savings banks but is readily adaptable for the use of banks of different kinds or institutions of any kind which may desire to issue certificates differing one from the other in kind or in the amount for which they are issued, and to keep a record of the certificates issued and of data relating to each certificate.

In carrying out the invention two sets of printing devices are provided. One set of printing devices is arranged to print on the certificate which is issued to the depositor and on the duplicate of that certificate, which is retained by the issuing office, the data for which blank spaces have been provided on the certificate when it was delivered by the Post Office Department to the issuing office. In the present certificate the data supplied by the issuing office is the date of issue, the date on which interest begins to run, the account number, which is given by the issuing office to the depositor and which is applied to each certificate issued to him, the name of the issuing or depository office and the name of the depositor. The denomination of the certificate and its serial number are printed upon the certificate by the Post Office Department before it is delivered to the issuing office. The second set of printing devices are arranged to print upon a record sheet those portions of the data carried by the certificate of which it may be desired to preserve a record and such other data as is desirable.

The present machine prints upon the record two consecutive numbers for each certificate issued. One of these numbers is of a series running from the beginning of the day's business and shows the number of certificates issued that day, and the other number is of a series running from the date of installation of the machine or from any other fixed date and shows the grand total number of certificates issued since that date. It also prints the denomination of the certificate issued, the number of certificates issued upon that particular operation of the machine, which in the present machine is always one, the serial number borne by the certificate, the account number which has been printed upon the certificate, and the identifying number of the operator who issued the certificate. At the end of the day a total record may be printed showing the total number of certificates issued during the day, the total amount of cash deposited for which certificates have been issued, the total number of certificates of each denomination issued and the grand total number of all certificates issued by this particular machine, or since a particular date, and the identifying number of the inspector or operator by whom the total record was taken. This record also bears the date upon which the records were made and an identifying number for the machine. In addition to the daily totals an inspector's total may be taken from the machine either at fixed periods or at such other times as may be desired. This inspector's record carries the same items as the daily total record and shows the total of business done since the last preceding inspector's record was taken.

Although the total records have been designated as "daily totals" and "inspectors' totals" it will be understood of course, that they may be taken at such times and by such persons as may be designated by those in charge of the system. For example, the postmaster or other officer in charge of the particular office in which the machine is installed may be required to take off a total at the end of each day's business and forward the same to the head office as a record of the day's business. The inspector's total may be taken by an inspector who will call at the issuing office either periodically or at such times as he may see fit and take off an "inspector's record" of all the business done since the last inspector's record was taken off. Or, if desired, the inspector's record may be converted into a periodical record, say a monthly record, and the officer in charge of the issuing office may be required to take off a total of the business done during each month, or any other given period, and forward such record to the head office. In this manner an accurate account is kept of all the transactions had by the issuing office and a positive check is provided for the accounts of the office. Further than this these records provide permanent records for the identification of certificates issued.

The machine which is here illustrated as embodying the invention comprises a main frame consisting of end members 1 and 2 connected one to the other by suitable tie bars, two of which are shown at 3 and 4 in Fig. 1. The end member 2 of the frame is of a less height than the end member 1 and a frame member 5 is supported on the tie bar 4 and the corresponding rear tie bar at a point between the end members 1 and 2 and coöperates with the upper portion of the end member 1 in supporting those devices which act upon the certificate and the duplicate of the certificate. The lower part of the machine, that is, those portions thereof supported by the frame member 2 and the lower portion of the member 1, contains the record printing and computing devices.

In the operation of the machine to make the certificate the latter is supported in a recess formed between the upper and lower portions of the machine and the present machine has a movable carrier or supporting frame 6 adapted to be moved into and out of the space between the upper and lower portions of the machine and having means for securing the certificate and the duplicate thereon in position to receive the impressions from the printing devices or other devices which act upon the certificate to provide it with the proper data. In the present instance this carrier consists of a flat plate having a series of impression pads 7 arranged to support those portions of the certificate and the duplicate which are to be acted upon by the printing devices. These pads are of resilient material, such as rubber, backed by a plate of metal, as shown at 8. Each is mounted in a recess in the carrier plate and is adjustable by means of screws 9. This plate is mounted in a track so that it may be slid into and out of the space between the upper and lower portions of the machine. The outer portion of the track is formed by the tie bar 4, shown in Figs. 1 and 5, and the corresponding tie bar 10, shown in Fig. 5 only. To form the track the bars are provided with longitudinal grooves 11 arranged along their inner faces and adapted to receive outwardly projecting flanges 12 formed on the lateral edges of the carrier plate. The inner portions of the tracks, which are indicated at 13, are separate from the outer portions thereof, the dividing line being adjacent to the inner surface of the upper frame member 5. Any suitable means may be provided for securing the certificate and the duplicate on the plate in proper position. This fastening means will, of course, be designed with respect to the character of the certificate to be made. It will be understood that the character of the certificate, as well as the duplicate, may be altered as circumstances may require and that the original and the duplicate may be made from separate pieces of paper or that they may be made on the same piece of paper and separated after they have been made. In the present instance the latter method is followed and the certificate issued by the postal savings system comprises a single sheet of paper having the certificate form on the upper portion thereof and the duplicate form on the lower portion thereof. The carrier plate is of such a size that the sheet or sheets of paper will fit snugly within the same and a suitable retaining device, such as the spring fingers 14, is provided to retain the sheet or sheets of paper in position on the carrier. The carrier for the certificate may be moved into and out of the machine by any suitable means but, in the present instance, this movement is imparted to the carrier by hand and, to this end, it is provided with a handle 15. The inner end of the carrier preferably supports inking rollers 16 journaled in lugs 17 and arranged to ink the printing devices, which will be hereinafter described.

The character of the data which appears on the face of the certificate and the duplicate will vary under various circumstances and that part of this data which is applied to the certificate and the duplicate by the machine may also be varied as circumstances may dictate. In the present instance the certificate as delivered to the issuing office has printed thereon such general information as is desirable and also has printed thereon the denomination of the certificate and the serial number of the certificate, it being understood that each certificate issued bears a serial number peculiar to that certificate. In this respect, as well as in the arrangement of the denomination figures the form of certificate follows the form of the United States currency. Spaces or blanks are left upon the face of the certificate and of the duplicate for the printing of the name of the depository or issuing office, the date upon which the certificate was issued, the date upon which interest will begin to run, which latter is usually the first day of the following month, the name of the depositor and the account number which is assigned to that particular depositor. This account number is given to the depositor when he makes his first deposit and is applied to all certificates of deposit which may be issued to him and he is known to the office by this number rather than by his name.

All or any part of the blanks left on the face of the certificate and the duplicate may be filled in by the machine. In the present instance the machine is adapted to fill in all of these blanks with the exception of that left for the name of the depositor. For the purpose of simplifying the present machine this blank is not filled in on the machine but the name is written in by hand or in any other suitable manner. It will be obvious, however, that the name can be inserted by the machine either by an adaptation of the devices to be hereinafter described or by an adaptation of well known typewriting devices. Further, the mechanism for filling in the blanks may be of any suitable character, that here shown being chosen for the purpose of illustration.

As here shown the name of the depository office is printed from electrotypes 18 and 19 arranged to print upon the certificate and duplicate, respectively. The date of issue is printed from type wheels 20 and 21 arranged to print on the certificate and duplicate, respectively. (See Figs. 11 and 13.) These type wheels are of ordinary construction, one carrying the year, another the month and two others carrying numerals from 0 to 9, inclusive. Suitable devices are provided operable from the exterior of the machine, which is inclosed by a casing 22, for setting these type wheels. While it is obvious that various devices may be employed for setting up the date, that here shown is highly satisfactory and enables the date to be quickly and accurately set. Each of the type wheels 20 and 21 is provided on one face with a gear 23 which is rigidly secured thereto and which mesh with racks 24 and 25, respectively carried by bars 26. There is a separate bar 26 for each pair of type wheels, that is, for the two type wheels which print the same data on the certificate and the duplicate. Consequently, the movement of any one of the bars 26 will simultaneously actuate the date printing wheels for the certificate and the duplicate, thus maintaining these always in the same positions and preventing any possibility of variance in the dates printed on the certificate and on the duplicate. Each bar is preferably provided with longitudinal slots 27 through which extend guide pins or grooved shafts 28 which retain the bars in proper relation to the respective gears. The upper edge of each bar is provided near one end thereof with a third rack 29 which meshes with a toothed segment 30 loosely mounted upon a shaft 31 which is mounted in the end members 1 and 5 of the frame and has secured thereto a handle 32 extending outward through a slot 33 in the casing 22. Along the edge of each slot is arranged a series of indications, preferably carried by a plate 34 and corresponding to the different characters carried by the respective type wheels. When the operating lever 32 is opposite one of these indications the corresponding character on the respective type wheel will be in printing position. The toothed segment and, consequently, the type wheels, are centered in proper printing position and are held against accidental displacement by means of an alining pawl 35 loosely mounted on a shaft 36 and having its nose adapted to engage a toothed segment 37 secured to and, in the present instance, formed integral with, the toothed segment 30. A spring 38 connected at one end to the pawl and at the other end to a rod 39 holds the pawl normally in engagement with these teeth. The teeth are pointed so as to provide V-shaped spaces between them and when the lever 32 has been actuated to move one of the printing counters into approximately its printing position the spring 38 will cause the point of the nose on the pawl 35 to seek the apex of the V-shaped space between the teeth within which it lies, thus causing the segment to move a distance sufficient to center the type wheels, that is, move the character into correct printing position. The tension of the spring 38 is sufficient to hold the type wheels and lever against accidental displacement but will yield to permit the movement of the lever when positive force is applied thereto. To facilitate the setting up of the type wheels and to enable the positions of the same to be determined at a glance a slot 40 is formed in the casing transversely to the slots 33 and each lever 32 has secured thereto a curved indicator plate 41 having thereon designations corresponding to the characters on the type wheels, these designations being so arranged that that designation corresponding to the character of the type wheel which is in printing position will be visible through the slot 40. Consequently, after the several levers have been moved down along the indicator plates 34 it can be determined by a glance through the slot or sight opening 40 whether or not the proper characters have been moved into printing position, the complete data being readable through this sight opening. In order that the indicator plate 41 may be more rigidly supported a supplemental supporting arm 42 may be secured to the lever structure 32 and arranged at an angle thereto, thus providing two points of support for the plate.

The interest date is printed on the certificate and duplicate from type wheels 43 and 44, (Figs. 12 and 13), each of which has on one face thereof a gear 45. These type wheels are similar to those which print the date of issue and the series of type printing wheels for the interest dates are arranged with their axes parallel with and adjacent to the respective series of type wheels for printing the issue dates. The gears 23 and 45 are arranged on opposite sides of their respective type wheels and consequently are not arranged in alinement. The gears 45 mesh with a rack bar 46 similar to and supported in the same manner as the rack bar 26. The rack bar 46 is provided with a rack 47 at that end opposite the rack 29 of the bar 26 and this rack 47 meshes with a toothed segment 48 loosely mounted on a shaft 49 and having an operating handle or lever 50. The operation of the lever and type wheels, the arrangement of the indicating devices and retaining pawl for this set of printing wheels is similar to that described in connection with the issue date printing wheels and need not be further described.

The account number is set up and printed in much the same manner that the dates are set up and printed. This mechanism is shown in detail in Fig. 9 and comprises two series of printing wheels 51 and 52 arranged to print on the certificate and the duplicate, respectively, and each bearing the characters 0 to 9. Each of these type wheels has secured thereto a gear 53 which meshes with a large driving gear 54 loosely mounted on a shaft 55 and meshing in turn with a toothed segment 56 loosely mounted on the shaft 31. This toothed segment is provided with a handle or lever 57 extending through a slot 58 in the casing, which slot is provided with an indicator plate 59 similar to the plate 34 described in connection with the issue date setting devices, and has secured thereto a second indicator plate 60, the indications on which are readable through an opening or transverse slot 61 which is also similar to the arrangement of the indicator plate for the date setting devices. A locking pawl 62 engages a toothed segment 63 rigidly connected with the toothed segment 56 and is held in engagement therewith by means of a spring 64. It is apparent, therefore, that the manipulation of the lever 57 will simultaneously actuate the corresponding type wheels 51 and 52 of the two series of type wheels and thus simultaneously set the printing devices to print the same account number on both the certificate and the duplicate.

It will be noted that the date printing wheels 20 and 21 and the account number printing wheels, 51 and 52 are arranged in longitudinal alinement, but on different axes. The outer ends of the shafts carrying these printing wheels are, therefor, mounted in the respective end members, 1 and 5, of the main frame, while the inner ends of said shafts are mounted on supplemental frame members, 500 and 501, which are supported by the tie bars 4 and 10. (See Figs. 1 and 47ª.)

Both the date of issue and the account number as printed upon the certificate appear on the record sheet. To this end the lower portion of the machine is provided with record printing devices arranged to print upon a web of paper which is preferably drawn from a roll 65 supported on the frame of the machine. These printing devices comprise an electrotype to print the headings, as shown at 65ª in Fig. 4. The date-of-issue printing devices comprise a set of printing wheels 66 having means for setting the same from the exterior of the casing. Inasmuch as the date printing device is of ordinary construction this device is not shown or described in detail. Suffice it to say that it is set to print the proper date before the commencement of each day's business.

The account number printing devices comprise a series of type wheels 67 mounted on a shaft 68 supported in brackets 68ª which, in turn, are carried by the tie bar 3 (see Fig. 19). These type wheels are loose on the shaft and each has secured thereto a gear 70 which meshes with a toothed segment 71 pivotally mounted on a shaft 72 (see Figs. 1 and 19) supported at one end in the end member 1 of the main frame and at the other end in a bracket 69 carried by the tie bars 3. The segment 71 has secured thereto an actuating arm 73 which, in turn, is connected by a link or connecting rod 74 with the lever 57 by means of which the account number printing devices for the certificate and the duplicate are set. Consequently, the movement of the lever 57 to set the printing devices to print the account number on the certificate will also set the devices for printing the account number upon the record sheet.

It is also desirable that certain of the data appearing on the face of the certificate should be printed upon the record, such for example, as the serial number and the denomination. The former is printed upon the record by devices very similar to those which print the account number upon the record. (See Fig. 7.) This device comprises a series of type wheels 75 mounted upon the shaft 68. The serial number usually carries as a prefix one of the letters of the alphabet. Consequently, the left-hand type wheel, 75ª, of this group is provided with the letters of the alphabet while the others are provided with the usual figures. Each wheel is provided with a gear 76 which meshes with a toothed segment 77 mounted on the shaft 72 and connected by an arm 78 and connecting rod 79 with the setting lever 80 mounted on the shaft 31 and extending through a slot 81 in the casing which is provided with indicators 82 and 83, as described in connection with the other setting devices. The lever 80 has secured thereto a toothed segment 84 coöperating with an alining pawl 85 to aline the type wheels in printing positions.

The denomination of the certificate issued is printed upon the record sheet by means of a single type wheel 86 loosely mounted on a shaft 87. Of course, certificates may be issued in any denominations but in the case of the postal savings banks the certificates as now issued correspond in denomination to the United States currency, which are as follows: one, two, five, ten, twenty, fifty and one hundred. The type wheel 86 is a seven point wheel and carries the character corresponding to one of said denominations on each point. The setting mechanism for the denomination type wheel is slightly different from those by means of which the serial number and the account number are set. This mechanism is best shown in Figs. 20 and 21. A setting lever 88 is loosely mounted on the shaft 31 on the outer side of one end of the frame, and has its outer end projecting through a slot in the casing and provided with a handle 89. This lever and slot are provided with the double indicating devices described in connection with the other setting levers, and also has a locking pawl 88ª engaging the toothed segment 89ª similar to the pawls and segments described in connection with the other setting devices. A toothed segment 90 is rigidly connected with the lever 88 and meshes with a gear 91 mounted on a stud 92 and rigidly connected with a gear 93 also mounted on the stud 92. The gear 93 meshes with a pinion 94 which in turn meshes with a pinion 95 on the outer end of a shaft 96 journaled in the opposite end members of the frame. The actuating lever 88 and the gearing just described are mounted on the frame member 1. The shaft 96 projects beyond both the frame members 1 and 2 and has secured to that end thereof which projects beyond the frame member 2 a pinion 97 which meshes with a gear 98 mounted on a short shaft 99 extending through the frame member 2 and having on its inner end a pinion 100. The latter pinion, in turn, meshes with a gear 101 rigidly secured to a shaft 102. A second gear 103 is also rigidly secured to the shaft 102 and is connected by pinions 104 and 105 with a gear 106 mounted on the shaft 87 and connected by a short sleeve 107 with the type wheel 86. It is apparent, therefore, that the shifting of the setting lever 88 will cause the type wheel 86 to rotate.

It is also desirable that there should be printed on the record sheet under appropriate headings the number of certificates of each denomination issued upon each operation of the machine. As the machine is at present constituted there can be but one certificate issued on each operation thereof and, consequently, the numbers appearing in the several columns under the several denomination headings is always one. A single printing device or type carrier is utilized to print this number in the several columns and to this end a type carrier 108 is slidably mounted upon the shaft 87. (See Figs. 18, 32 and 39.) The carrier 108 has a laterally extending slotted arm 109 which engages a rod 110 extending parallel with the shaft 87 to hold the carrier against rotation on the shaft. The carrier also has secured thereto a grooved collar 111 into which extends the end of an arm 112 carried by a nut 113 mounted upon a screw 114 carried by the shaft 96. Consequently, when the shaft 96 is rotated by the manipulation of the setting lever 88 for the denomination printing type wheel the type carrier 108 will be moved longitudinally to the shaft 87 a distance proportionate to the amount of movement imparted to the lever, the ratio of the movements of the parts being such that the type carrier will stop in that column corresponding with the denomination which the type wheel is set to print.

Extending parallel with the shafts 87 and 96 is a shaft 115 having mounted thereon a series of groups of printing counters adapted to compute and print the total number of certificates issued of each denomination and the total amount of cash received. It has, therefore, seven groups of total adding counters 116 each adapted to compute and print the total number of certificates issued of one denomination. There is also another group of printing counters 117 adapted to compute and print the sum of the amounts for which the several certificates have been issued. Inasmuch as no certificate is issued for a fraction of a dollar the total cash adder does not compute the cents but only the even dollars. The several groups of counters 116 are of ordinary construction. The units counter of each group is provided with an actuating gear 118 and the count is transferred from the units counter to the tens counter and from the tens counter to the hundredths counter by a well known mechanism which it is not necessary to here describe in detail. Movement is imparted to the units counter wheel to advance the same one step by means of a one-tooth actuating gear 119 slidably mounted upon a shaft 120 and held against rotation relatively thereto. This actuator is provided with a grooved collar 121 to receive a fork 122 carried by an arm 123 projecting from the nut 113, thereby causing the one toothed actuator to move longitudinally to its shaft in unison with the movement of the type carrier 108. Rotary movement is imparted to the shaft 120 to cause the one toothed actuator to engage the gear 118 of that group of counters opposite which it is set and thus record the certificate in the proper denomination column by mechanism which will be hereinafter described.

Means is also provided to add to the total cash counters 117 the amount of each certificate issued. (See Figs. 18, 19 and 23—31.) To accomplish this the certificates are divided into three groups, the first including the denominations one, ten and one hundred, the second, two and twenty, and the third, five and fifty. To add the denominations of the first group to the total cash counter I provide a one-toothed actuator 124 which is caused to engage the gear of the units counter to add one thereto, and is caused to engage the gear of the tens and hundredths counters to add ten or one hundred, respectively, to said total cash counter. For the second group there is provided a two-toothed actuator 125 which is adapted to be moved into operative relation to the units counter to add two to the total cash counters and into operative relation with the tens counter to add twenty to the total cash counter. For the third group a five-toothed actuator 126 is provided which may be moved into operative relation with the units and tens counter to add the respective denominations thereto. These several actuators are slidably mounted upon the shaft 120 between the arms of a yoke 127 slidably mounted upon a shaft 128. This yoke is provided with a pin 129 adapted to enter the cam groove in a cam 130 mounted on the shaft 102. The shaft 102 receives rotary movement from the denomination setting lever 88 through the shaft 96, as above described, and the shape of the cam groove is such that the proper one of the group of actuators, 124, 125 and 126, will be moved into operative relation with either the units, tens or hundreds counter wheels of the total cash counter. These actuators are loosely mounted upon the shaft 120 and the latter is free to rotate relatively thereto. Separate actuating devices are provided to impart movement to the several actuators and to this end each actuator has secured thereto a gear 131 adapted to mesh with one of the group of actuating gears 132 loosely mounted on a shaft 133 and held against movement longitudinally thereto. As stated, the shaft 133 is normally free to rotate relatively to the driving gears 132 and is adapted to be connected to any one of those gears to actuate the same by means of a slidable key 134. This key is carried at one end of a bar 135 mounted in a keyway in the shaft 133. The hub of each of the gears 132 is provided with four grooves or slots extending parallel with and adapted to be moved into registration with the keyway in the shaft and to receive the key 134, thereby locking that particular gear to the shaft and causing the same to rotate therewith. In the present construction the shaft 133 rotates through but three-fourths of a revolution upon each operation of the machine. Consequently, it is necessary to provide the hubs of the gears with four grooves in order that there may always be a groove opposite the keyway in the shaft when the shaft is at rest. The ratio of the gears 132 and 131 is such that three-fourths of a revolution of one of the gears 132 will impart a full revolution to the gear 131 with which it is in mesh, thereby rotating the actuator through a complete revolution. Longitudinal movement is imparted to the bar 135 carrying the key 134 to move the same into operative relation with the desired gear by means of a collar 136 slidably mounted on the shaft 133 and having an annular groove to receive a yoke 137 carried by a sleeve 138 slidably mounted on a shaft 139. The sleeve 138 has a projection or pin 140 adapted to enter the cam groove of a cam 141 which is carried by a sleeve 142 loosely mounted on the shaft 96. This cam has secured thereto a gear 143 which meshes with the gear 100 mounted on the shaft 99 which is rotated from the shaft 96 as above described. Consequently, the cam 141 will be rotated in unison with the screw 114 and the cam 130 and the shape of the groove in the cam 141 is such as to move the key 134 into position to connect the gear, which meshes with the actuator which it is desired to operate, with the shaft 133. It will be noted that the key has but three positions and consequently the groove of the cam, as shown in Fig. 34, comprises three straight portions laterally offset one from the other. The gears 132 and the actuators are held normally against movement by means of a locking arm or plate 144 carried by the sleeve 138 and having in its lower edge a groove 145 to engage one of the teeth of each of the actuators and having at an intermediate point a tooth 146 to engage between the teeth of each of the gears 132. The lower end of the plate or arm is provided with a transverse slot 147 and the tooth 146 is provided with a similar slot or opening 148. These slots are so arranged with relation to the key 134 that they will be moved into alinement with the gear which is connected to the shaft and the actuator which meshes with that gear, thus releasing both the gear and the actuator and permitting the same to be actuated by the rotation of the shaft 133 which is accomplished in the manner to be hereinafter described.

The record sheet also carries two series of consecutive numbers, the first indicating the number of certificates which have been issued since the beginning of the day's business and the other indicating the grand total number of certificates which have been issued since the installation of the machine or since some other fixed prior date. The first of these numbers is printed on the certificate by means of printing counters of ordinary construction, there being a group of these counters mounted in alinement with the shaft 87 which carries the denomination printing devices, as indicated at 149, and a second group on the rear countershaft or totalizing shaft, as indicated at 150. These counters are of ordinary construction comprising counter wheels each having an actuating gear secured thereto and means for transferring the count from the units counter to the tens counter, from the tens counter to the hundredths counter, etc., in the usual manner. The units counters of both groups, 149 and 150, are advanced one point upon each revolution of the actuator shaft 120 by means of a one-toothed actuator 151 rigidly secured to that shaft and arranged to engage the gear of both said units counters when said actuator shaft is rotated. Both groups of counters are reset to zero at the end of each day's business and inasmuch as one is added to each group of counters upon each operation of the machine it will be obvious that that group of counters mounted on the front counter shaft and which prints the detail certificate record will print in that record the daily serial number for the certificate which is being issued and that that group of counters on the totalizing or rear countershaft will always indicate the total number of certificates that have been issued during the day, and, when the total record is printed, will print this number on that record. The several groups of counters on the rear countershaft, i. e., the counters 116, 117 and 150, are all reset to zero after the daily record has been printed. This is accomplished by mounting these counters on a resetting shaft of ordinary construction, the rotation of which will return each of the counters of each group to its zero position. Inasmuch as the construction of such shafts are of well known construction and any desired construction may be employed in the present instance it is not necessary to describe the same in detail. The front group of counters 149 is mounted upon a resetting shaft 152 which is arranged in alinement with but disconnected from the shaft 87 and is a resetting shaft of the same character as the rear resetting shaft. This shaft is reset simultaneously with the resetting of the rear shaft and is preferably operated from that shaft. To this end it is provided with a gear 153 meshing with an idle gear 154 mounted on the projecting end of the shaft 120, which idle gear in turn meshes with a gear 155 mounted on the end of the rear resetting shaft 115. Consequently, the operation of this rear shaft will rotate the shaft 152 carrying the printing counters.

The second series of numbering counters, i. e., the numbering counters printing the grand total consecutive number, are mounted on the shaft 87, as indicated at 156, to print the detail record and on the shaft 115, as indicated at 157, to print the grand total cash certificate record. These counters are printing counters of ordinary construction and are actuated from an actuator 158 mounted on the actuator shaft 120. This group of counters is never reset and, therefore, it will indicate the grand total of certificates issued by the machine up to 99,999.

The operation of the machine is accomplished by means of a handle 159 mounted on a stud 160 journaled in the end member 1 of the frame and projecting outwardly beyond the cabinet or casing 22. This stud has mounted thereon and rotating therewith two gears, indicated by the reference numerals 161 and 162. The former gear operates the printing mechanism for making the certificate, while the latter operates the actuators for the recording counters and further actuates the printing mechanism to print the detail record on the record sheet. The latter gear, 162, meshes with a gear 163 secured to the shaft 133 which extends through the machine and beyond the frame member 2 and has mounted thereon a gear 164, which gear meshes with a gear 165 on the shaft 120 which carries the actuators for the consecutive number counters and also for the totalizing counters for computing the number of certificates under each denomination. It will be recalled that the shaft 133 has mounted thereon the actuating gears for the total cash actuators 124, 125 and 126. Consequently, it will be apparent that the operation of the shaft 133 by the rotation of the handle 159 will impart movement to the actuators to cause them to operate the counters with which they are in operative relation. The mechanism is so arranged and the gears are of such ratio that two complete revolutions are imparted to the handle 159 to operate the machine, the ratio of the gears 162 and 163 being such that these two revolutions will impart but three-fourths of a revolution to the shaft 133 and the gears 164 and 165 being of such ratio that the three-fourths revolution of the shaft 133 will impart a complete revolution to the shaft 120. This arrangement, however, of the mechanism is made for mechanical reasons only and it is obvious that it may be varied at will. The gear 163 which meshes with the gear 162 on the handle stud also meshes with a gear 166 on a stud 167 mounted on the frame member 1 and connected with a cam plate 168 having formed in one face thereof a cam groove 169 which operates the printing mechanism to print the detail record.

This printing mechanism is of a well known construction and is similar to that employed in Patent No. 990,666, issued April 25th, 1911, to Ohmer, Whistler and McAllister and it is not necessary that the same should be here described in detail. Suffice it to say that the mechanism comprises a carriage consisting of two connected plates 170 slidably mounted in the respective side members of the frame, one of which is shown in Fig. 4, and having racks 171 meshing with gears 172 on a shaft 173, the rotation of which causes the carriage to reciprocate in the frame. Mounted in the carriage is an inking roller 174 and a platen 175. The platen is mounted on a shaft, the ends of which extend beyond the plates 170 into cam grooves which move the same into and out of relation with the printing counters at the proper time. The paper upon which the record is printed is carried on the roll 65 and is fed forward by means of feed rollers 177, all in the same manner as described in the above mentioned patent. The printing mechanism is not a part of the present invention and the only feature of the operation which is of interest is the manner in which the shaft 173 is rotated by the action of the operating handle 159 through the cam 168. As here shown, the shaft 173 is provided with a mutilated gear 178 adapted to be engaged by a toothed segment 179 carried by an arm 180 pivotally supported on the shaft 181. Connected with the arm 180 is a link 182 having a pin 183 extending into the cam groove 169 and also having at its inner end a slot 184 to receive the stud 167 and guide the link 182. The gears 166 and 163 are of such ratio that three-fourths of a revolution of the gear 163 will impart a full revolution to the gear 166 and the cam 168. The groove 169 in the cam 168 is so shaped that the last portion of the movement of the cam will impart a reciprocatory movement to the link 182, thereby causing the toothed segment 179 to engage the gear 178 and operate the printing mechanism, this operation taking place after the actuating devices for the several counters has been completed.

The gear 161 on the handle stud 160 meshes with a gear 185 mounted on a stud 186 and meshing with another gear 188 mounted on the shaft 55 which, in turn, meshes with a gear 189 mounted on the shaft 49 and rigidly secured thereto. Mounted on the shaft 49 is a cam 191 having in one face thereof a groove 192. A pin 193 mounted on an arm 194 extends into the groove 192 and the arm 194 is rigidly secured to a shaft 195 extending longitudinally to the machine and operatively connected with the printing devices for making the certificate. To take an impression from the certificate printing devices the carrier plate 6 having the impression pad 7 is moved upward to press the certificate, which rests upon the same, against the type of the certificate printing devices.

It will be recalled that the track in which the carrier 6 slides is formed in two parts, the inner part of the track, the two portions of which are indicated by the reference numeral 13, being formed integral with a frame 196 which is bodily movable toward and away from the type. This frame is operated from the shaft 195 by the rocking movement imparted to that shaft from the cam 191. To this end the frame is provided with depending lugs 197 and 198. The lugs 197 and 198 are provided with horizontal slots to receive pins 200 carried by arms 201, one of which is rigidly secured to the shaft 195 and the other of which is mounted on the supporting shaft 139. One of the arms 201 is provided at its inner end with a slot 203 to receive a pin 204 mounted in the other arm, thereby connecting the two arms together and causing the same to move in unison. It will be obvious, therefore, that when a rocking movement is imparted to the shaft 195 in the direction of the arrow, that is, in a direction to move the inner ends of the arms 201 downward, the outer ends of the arms will both be elevated and the frame upon which is mounted the carrier 6 will be moved upward and the printing on the certificate will be accomplished. The carrier is provided at its opposite ends with depending lugs 199 having guideways to receive pins 199ª mounted on the respective end members of the main frame, thus guiding the carrier in its vertical movement. (See Figs. 6 and 19.)

It is desirable that the setting levers for setting the type wheels of the several printing devices should be locked against movement during the printing operation. It will be noted that the several locking and alining pawls for the respective setting levers are mounted on the same shaft, 36, the pawls are loosely mounted on this shaft and are held in engagement with their toothed segments by means of springs. To lock the pawls in engagement with their segments and thus lock the setting levers against movement two arms 205 are rigidly secured to the shaft 36 and a rod 206 is mounted in the outer ends of these rods and extends above the several pawls. A crank arm 207 is rigidly secured to the shaft 36 and has extending from its outer end a projection, such as a roller 208, adapted to ride upon the periphery of a cam 209 rigidly secured to the shaft 49 which is rotated by the operation of the handle. This cam is provided in its periphery with a recess 210 so arranged that when the machine is idle and the cam is in its normal position the roller 208 of the actuating arm 207 will rest in this recess. When the shaft and cam are rotated, however, the roller will move out of the groove and ride over the periphery of the cam, thus rocking the shaft 36 about its longitudinal axis and causing the rod 206 to be moved into engagement with or into a position close to the several alining and locking pawls, thereby locking these pawls against upward movement and in this manner locking the setting levers against movement in either direction. The recess 210 is of such a length that the cam may rotate through a short distance before the shaft 36 is actuated, thus allowing time for the operation of certain locking devices to be hereinafter described. Preferably, a spring 211 is connected to the arm 207 to hold it in engagement with the cam.

It is also desirable that means should be provided to return the setting levers to their normal or zero positions at the completion of the making of the certificate. To this end a rod 212 is extended along the lower edges of the several levers and parallel with the shaft 31. This rod is preferably mounted in arms 213 mounted on the shaft 31 which has secured thereto a gear 214. Meshing with the gear 214 is a toothed segment 215 carried by an arm 216 mounted on the shaft 55 and rigidly connected with a second arm 217 having at its outer end a projection, such as a roller 218. It will be apparent that when any one of the setting levers is moved downward it will engage the rod 212, thus rocking the shaft 31 and moving the roller or projection 218 toward the shaft 49. This shaft has mounted thereon a finger 219 which, when the shaft is in its idle position, is just beneath the position assumed by the roller 218 when one of the setting levers is actuated. The lower surface of the finger is inclined and when the shaft 49 is rotated this inclined edge of the finger will engage the roller 218 and force the same forward out of the path of the finger, thereby causing the segment 215 to actuate the gear 214 and shaft 31 and thus cause the rod 212 to move upward and to carry the setting levers to their normal positions. It will be noted that the arrangement of the roller with relation to the finger 219 is such that the finger will engage the roller during the last portion of the movement of the shaft 49 and after the printing operations have been completed.

Suitable devices are provided to prevent the operation of the recording and printing mechanisms in case the operating handle should be manipulated when there was no certificate in the machine or when the certificate which was placed in the machine did not correspond in denomination to the denomination which the recording devices had been set to record and to print upon the record sheet. To accomplish this result two feeler-controlled locks are provided which, if either of the conditions above mentioned exist, will lock the handle against further movement before it has been moved far enough to make a record of any kind. These two locks are somewhat similar in their construction but operate in slightly different manners. In the one instance the locking parts are normally disengaged but if the feeler is operated without there being a certificate in the machine these parts will be moved into engagement, that is, into their locking positions. In the second instance the locking parts are normally in their locked positions but if the feeler is operated when the certificate in the machine is of the wrong denomination the parts will remain locked. If the certificate is of the proper denomination the parts will be moved into their operative or unlocked positions. In both instances the locks are controlled by the blank certificate, or certificate-forming material, between the two coöperating parts of the certificate-making devices, which in the present construction comprise the type wheels and the carrier. These results can be accomplished in various ways and by various modifications of the mechanisms here shown but that which has been used to illustrate the invention is a practical one.

Referring first to the device for locking the operating mechanism against movement in the absence of a certificate, shown in Figs. 40 and 41, it will be seen that the locking device proper comprises a plate 220 mounted on the shaft 49 and having secured to one face thereof a projection 221 which, in the present instance, is carried by an annular band secured to the face of the plate. A locking arm 222 is pivotally mounted on a shaft 223 extending parallel with the shaft 49 and is provided at its free end with a laterally extending projection or nose 224 arranged to be moved into and out of the path of the projection 221. Rigidly secured to the arm 222 and extending at an angle thereto is a projection 225 having a slot 226 to receive a pin 227 carried by one end of an arm 228 loosely mounted on a shaft 229. This arm 228 has connected therewith an arm 228$^a$ extending some distance beyond the shaft 229 and having pivotally connected thereto a plunger 230 which travels in a guide 231 arranged above the certificate carrier 6 and constitutes a feeler. Rigidly secured to the shaft 229 is a bell crank lever 232. The lower arm of the bell crank lever has a lip 235 extending beneath that portion of the arm 228 which carries the feeler 230. A spring 236 is interposed between the upper arm of the lever 232 and the feeler carrying arm 228$^a$. Rigidly secured to the shaft 229 is a second arm 233 having at its outer end a pin 233$^a$ adapted to enter a cam groove 234 in the cam plate 220 which, as above stated, is rigidly secured to the shaft 49. It will be apparent, therefore, that the rotation of the cam plate 220 will impart a rocking motion to both the arm 233 and the shaft 229 and that the downward movement of this lever will be transmitted through the shaft 229, lever 232 and spring 236 to the feeler arm 228$^a$, thereby causing the feeler to move downward. This downward movement will tend to rock the arm 222 about the axis of the shaft 223 and if unobstructed will move the projection 224 into the path of the stop 221 on the plate 220, thus locking the shaft 49 against further movement. However, if there is a certificate in the machine the plunger will engage the certificate and the movement of the arms 228$^a$ and 228 and, consequently, of the arm 222 will be checked. The spring 236 will yield sufficiently to permit the pin 233$^a$ to travel about the cam slot. Consequently, the operation of the machine will not be interfered with.

In Figs. 42 to 49 is shown the device for locking the machine against operation if the certificate inserted is not of the denomination which the machine is set to record. In this instance the locking parts comprise a collar 237 rigidly secured to the shaft 49 and having a lip or projection 238 and an arm 239 loosely mounted on the shaft 223 and having a nose 240 which lies normally in the path of the lip 238. The arm 239 is movably mounted on the shaft 223 and is preferably carried by a sleeve 241 loosely mounted on that shaft. Arranged on one side of the sleeve 241 is a longitudinal rib 242 having a longitudinal groove 243 to receive a finger 244 which, in turn, is carried by a sleeve 245 slidably mounted on the shaft 229 and having rigidly secured thereto an arm 246 to the outer end of which is pivotally connected a plunger or feeler 247, guided in an apertured finger 248 and adapted to move through openings in the carrier and in the certificate when downward movement is imparted to the plunger or feeler by the movement of the operating devices for the machine and this downward movement is controlled by the denomination of the certificate which is on the carrier.

If no certificate at all is on the carrier the locking mechanism first described will operate. However, if there is a certificate on the carrier but it is not of the proper denomination, i. e., it is not of the denomination which the machine is set to record, then the downward movement of the plunger 247 will be interrupted before the nose of the arm 239 has been moved out of the path of the lug 238 on the shaft 49 and the mechanism will remain locked against operation. Any suitable arrangement of certificate or carrier may be provided which will interrupt the movement of the feeler or permit the same to continue its movement according to the denomination of the certificate. In the present instance certificates of each denomination have therein an opening located in a position peculiar to that denomination and the position of the plunger or feeler is so controlled that when the machine is set to register a certificate corresponding to the denomination of the certificate on the carrier, the plunger or feeler will be in alinement with the opening in the certificate and the downward movement of said plunger or feeler will be uninterrupted and this continued downward movement will rock the arm 239 about the axis of the shaft 223 and move its nose out of the path of the lug 238 on the shaft 49, thereby allowing the shaft to continue its rotation. Preferably, the carrier is provided with a longitudinal series of openings indicated at 249 in Figs. 5 and 6 and the openings in the certificates of different denominations are so arranged that each will register with one of the openings 249. The movement of the plunger to bring the same into alinement with the opening of the particular denomination which the machine is set to record may be accomplished in any suitable manner and is preferably accomplished by the movement of the denomination setting lever and the downward movement of the plunger is accomplished by means of the cam 220 on the shaft 49 which imparts rocking movement to the shaft 229 on which the sleeve 245 is mounted. Mounted upon the shaft 229 at that end of the sleeve 245 adjacent the arm 246 is a bell crank lever 250 similar to the lever 232 of Fig. 40. The upper arm of this bell crank lever is offset to bring the outer end thereof above the arm 246 and a spring 251 is interposed between the arm of the lever and the arm which carries the plunger. The lower arm of the bell crank lever has a transverse lip 252 which extends beneath the arm 246 and elevates the same when the arms of the lever are moved upward. As has been above stated the sleeve 245 is loosely mounted on the shaft 229 and has both rotatory and reciprocatory movement relatively thereto. The bell crank lever 250 is so mounted on the shaft that it is free to move longitudinally thereto but is held against rotatory movement relatively thereto. To this end its hub is provided with a lug or key 253 adapted to enter a longitudinal groove 254 in the shaft 229. The hub portion of the bell crank lever is connected with the sleeve 245 in such a manner as to cause the two parts to move together longitudinally of the shaft but to permit them a limited amount of relative movement about the axis of the shaft 229. This longitudinal movement is imparted to these parts to move the plunger into alinement with the proper opening 249 by means of a cam 255 mounted on the shaft 223 and adapted to be rotated by the movement of the denomination setting lever. To this end the shaft 223 is provided with a gear 256 (see Fig. 2) meshing with a second gear 257 having rigidly secured thereto a third gear 258 which latter gear meshes with a segment 259 rigidly connected with the denomination setting lever 88. The ratio of the gears and toothed segment are such that the movement of the lever to set the recording mechanism to print any one of the several denominations will rotate the cam 255 and move the plunger or feeler 247 into alinement with the opening in the carrier corresponding to that particular denomination. The connection between the sleeve 245 and the cam is formed by means of a collar 260 having thereon a pin 261 adapted to enter the groove in the cam 255. This collar is provided with a recessed arm 262 adapted to engage the shaft 55 to hold the collar against rotary movement but to permit the same to move freely longitudinally to the shaft 229. This collar is connected to the bell crank lever and to the sleeve in such a manner as to permit these two latter parts to have a slight rotary movement relatively thereto. Preferably, the sleeve has a flange 263 in which are formed slots 264 and the hub of the bell crank lever is also provided with slots, as indicated at 265. Screws 266 extend through the slots 264 and 265 and into the collar 260, thus connecting the parts firmly together but permitting the sleeve and the bell crank lever to have rotary movement through the length of the slots. At the beginning of the movement of the operating handle and shaft 49 the cam 220 will rock the shaft 229, thus moving the upper arm of the bell crank lever 250 downward and if the certificate on the carrier has an opening in alinement with the plunger the arm 246 will continue its downward movement and the arm 244 at the other end of the sleeve 245 will continue its upward movement through a distance sufficient to carry the nose of the arm 239 out of the path of the projection 238. However, if the certificate on the carrier has no opening in alinement with the pawl then the movement of the arms 246 and 239 will be checked before the nose of the arm 239 is moved out of the path of the projection 238 and the machine will remain locked. The spring 251 will compress to permit the arm 239 to rock without affecting the position of the plunger 247.

While in the present type of the machine both feelers comprise vertically reciprocating plungers it will be understood that this particular construction of feeler is not essential to the successful operation of the machine and that the term "feeler" as used in the specification and claims is intended to include any sensitive device operating in a substantially similar manner to accomplish similar results, whether it be in the form of a plunger operating through apertures or otherwise. Further, it is not necessary that the two feelers should be of the same construction.

Means are provided which make it necessary to complete two rotations of the operating handle before the parts can be returned to their normal positions, and, consequently, before the machine can be further operated. This mechanism, however, is of such a character that the operating handle may be moved a distance far enough for the feeler to operate before it is locked against return movement. Thus, if the first movement of the handle finds the operating mechanism locked, because of the absence of a certificate or because the certificate is of the wrong denomination, and the handle can then be returned to zero position and the error corrected without any marking having been made either on the certificate or upon the record sheet. In the present instance this mechanism comprises a ratchet 280 (see Fig. 51) rigidly secured to the shaft 49 which, it will be recalled, makes one rotation for two revolutions of the operating handle. A pawl 281 is pivotally supported near the ratchet and has its nose held normally in engagement therewith by a spring 282. When the shaft 49 is turned in a forward direction the pawl will ride over the teeth of the ratchet and permit this forward movement to be continued but any attempt to move the shaft in a reverse direction, after the pawl has taken hold of the ratchet teeth, will be frustrated. To permit the feelers to operate before the shaft 49 is locked against reverse movement the ratchet 280 is provided with a smooth portion 283 over which the pawl may move in either direction. The length of this smooth portion of the ratchet is such that the feelers will have operated before the pawl engages the first tooth of the ratchet. Means are also provided for preventing the overthrow of the mechanism and this means, in the present instance, comprises a pawl 284 pivotally mounted on an arm 284ª movable with the ratchet 280 and having a lip 285 turned at an angle thereto. A stop 286 is secured to a fixed part of the machine and occupies a position close to the pawl 284. Mounted on the shaft 49 adjacent to the ratchet and held against rotation therewith is a collar 287 having thereon a cam surface 288 arranged to engage the lip of the pawl and move the latter about its pivotal center, the pawl being held in engagement with the collar by means of a spring 289. The cam surface 288 is so arranged with reference to the lip of the pawl that the pawl will be raised just prior to the completion of the movement of the shaft 190 and the stop 286 is so arranged with reference to the lip of the pawl that when the latter is in its raised position the stop will lie in the path of the lip. Consequently, it will be apparent that the movement of the ratchet and, consequently, of the shaft 49 will be checked when it has completed a single revolution. The stop 286 is spaced a distance from the collar 287 sufficient to allow the lip of the pawl to pass between the stop and the collar. The end of the cam 288 is so arranged with reference to the stop 286 that there will be just room for the lip of the pawl to pass downward between these parts and assume its normal position when the parts are at rest. The spring 289, however, is a soft one and unless the shaft is moving at a very slow rate of speed the lip of the pawl will engage the stop before it can be moved downward a distance sufficient to clear the stop and the forward movement of the ratchet will be checked, after which the pawl will move into its lower or normal position.

In addition to the detail record and the daily total records, the mechanism for producing which has been described, mechanism is provided for accumulating a periodical total record of the items relating to the certificates issued during that period, which may be either a fixed or a variable period. The mechanism for producing this periodical record is similar to that shown and described in the patent above referred to and in its detail construction does not form a part of the present invention, but in order that its operation may be understood and its coöperation in combination with the other parts of the mechanism appreciated the essential features of the same will be briefly described. (See Figs. 3, 4, 18 and 39.)

The accumulator, as the periodical totalizer will be termed, comprises a series of counters corresponding in number and arrangement with the totalizing counters on the shaft 115. These counters are here indicated as a whole by the reference numeral 275 and are mounted on a resetting shaft 276, one end of which projects beyond the cabinet and is provided with a squared end 277 to receive a key to reset the same. In the present type of machine these counters comprise gears only and do not employ type wheels. These gears are arranged to be actuated by the same actuators that actuate the totalizing counters on the shaft 115. Consequently, the record accumulated by the two shafts will be the same. It will be noted, however, that the accumulator does not carry any counters corresponding to the grand total counters 157. Inasmuch as these latter counters are never reset to zero it is not necessary that they should be duplicated on the accumulator shaft, as will hereinafter appear. The shaft 276 is journaled in arms 278 which are mounted on the shaft 181 journaled in the main frame and movable to permit the accumulator gears to be moved into and out of mesh with the gears of the totalizer counter on the shaft 115. The totalizing counters and the accumulator counters are reset to zero independently of each other and it will be apparent, therefore, that if the totalizing counters are reset to zero, the accumulator counters, containing an accumulated record, moved into mesh with the gears of the totalizing counters and then reset to zero, the totalizing counters will be advanced a distance corresponding to the record contained, and thereby transferred, by the accumulator counters. The operation of the printing mechanism will then print from the totalizing counters on the shaft 115 the record accumulated by the accumulator counters.

Inasmuch as the grand total counters 157 are never reset to zero the record of these counters will also appear in the periodical record.

Locking devices are employed to lock the accumulator against downward movement, that is, against movement to bring its gears into mesh with the totalizing counter gears, until the inspector or proper official has inserted his key in a key barrel 290 in the machine and unlocked the same. This act of inserting the inspector's key and unlocking the machine actuates printing counters 291 to set them to print an identifying number held by that officer, thereby causing the identity of the officer taking the record to appear on the record itself. The locking devices, as here shown, comprise arms 292 and 293 secured to the opposite ends of the shaft 181 to which the supporting arms for the accumulator are secured. These arms extend downwardly and have at their lower ends laterally extending projections 294 and 295. Rigidly secured to each end of a shaft 296 and arranged in alinement with the respective projections 294 and 295 are lugs 297 and 298. Normally these lugs lie in the path of the projections on the arms 292 and 293 and hold the shaft 181 against rotation and, consequently, lock the accumulator in its elevated position. To release the locking devices and permit the accumulator to be moved into operative relation with the totalizer the shaft 296 is rotated to move the lugs carried thereby out of the path of the projections on the arms 292 and 293. This movement of the shaft is here shown as accomplished by means of a key-actuated mechanism comprising an arm 299 rigidly secured to the shaft 296 and loosely connected to an arm 300 pivotally mounted on the frame at 301 and having a portion curved about the key barrel 290 and provided with a lug 302 to be engaged by the key to move the levers and actuate the shaft 296.

To lock the accumulator in operative relation with the totalizer counters until it has been reset to zero and the record transferred to said totalizer counters, the shaft 296 has loosely mounted thereon at that end adjacent to the arm 293 an arm 303 having a slot 304. A lever 305 is pivotally connected to the arm 303 by means of a pin 306 extending through the arm and the slot 304 and is pivotally mounted at 307 on the frame. A finger 308 is connected with the lever 305 and projects beyond the pivotal center thereof. This finger is provided with a nose 309 arranged in the path of a disk 310 carried by the accumulator shaft and having therein a notch 311. When the accumulator shaft is moved downward into operative relation with the totalizer gears that portion of the disk 310 immediately adjacent the notch 311 will engage the nose 309 of the finger 308 and rock the shaft 305 about its pivotal center, thus moving the arm 303 upward, the arm 293 having moved rearwardly, and causing a nose 312 on the arm 303 to extend in front of the projection 295 on the arm 293, thus locking the arm against outward movement. When the accumulator shaft is rotated to reset the accumulator to zero the nose 309 will enter the notch 311 just before the disk completes its movement, thus permitting the lever 305 to move about its center under the influence of a spring 313 and thereby move the nose 312 out of the path of the projection 295 and permit the accumulator to be moved upward into its normal position. When in this position a lug 314 rigidly secured to the frame extends into a recess 315 in a second disk 310$^a$ pinned to the disk 310 and locks the accumulator shaft against rotation, thus preventing the resetting of the counters when in this position. Means are also provided for locking the operating handle against movement while the accumulator is in its lower position. To this end a disk 316 is connected with the gear 166 (see Fig. 2) and has in its periphery a notch 317 adapted to receive a nose 318 carried by the inner end of an arm 319 which is rigidly secured to the shaft 181. When the accumulator is moved downward the shaft 181 is rocked about its longitudinal axis and the nose 318 enters the recess 317, thus locking the gear and, consequently, the operating handle against movement.

A similar disk 316$^a$, also mounted on the stud 167, is utilized to lock the machine against operation until the operator has inserted his identifying key. To this end the disk is provided with a second notch 320 arranged to receive a nose 321 on an arm 322 which is loosely mounted on the shaft 133. A second arm 323 is connected with the arm 322 and is loosely connected with a lever 324 pivotally mounted on a frame 325 having a portion curved about a key barrel 326 and provided with a projection 327 to be engaged by the operator's key when it is inserted in the key barrel and thus cause the lever 324 to rock about its pivotal center and thus rock the arm 322 to cause the same to withdraw its nose 321 from the recess in the disk 316. The rotation of the key in the barrel 326 actuates identifying counters 328 to cause the identifying number of the operator who has inserted his key to be set up and printed on the detail record. So long as the key remains in the machine the machine can be operated. As soon as it is withdrawn the machine is locked against operation and the printing mechanism cannot be actuated.

In order to transfer the record from the accumulator to the totalizing counters it is necessary that the latter should be reset to zero. If the accumulator counters should be moved into mesh with the gears of the totalizing counters before the latter were reset to zero the count of the accumulator would not be transferred and the result would be a confusion of the record. To prevent any possibility of this confusion a suitable locking device is provided to lock the accumulator against downward movement until the totalizing counters have been reset to zero. In Fig. 50 is shown in detail one form of lock for accomplishing this result. As here shown the rear countershaft 115 has rigidly secured thereto a collar provided with a nose or projection 329 and a finger 330 is loosely mounted on the transfer shaft for the accumulator counters. This finger has a shoulder 331 arranged to enter a notch 332 in a collar 333 rigidly secured to the accumulator shaft, when the latter is in its normal or raised position. The relation of the shoulder to the upper wall of the notch is such that the accumulator shaft 276 is locked against downward movement so long as the shoulder is in engagement with the wall of the notch. When the parts are in their normal positions the nose 229 on the rear countershaft or totalizing shaft lies just beyond the lower end of the finger 330. Consequently, when the rear countershaft is rotated to reset the counters thereon to zero this nose will, during the latter part of the movement of the shaft, engage the lower end of the finger and move the same about its pivotal center, thus carrying the shoulder thereon out of engagement with the notch in the disk and releasing the accumulator to permit it to be moved downward. To return the finger to locking position a second finger 334 is rigidly connected therewith and extends into a position adjacent to the shaft 133, which rotates upon each operation of the machine to record a certificate. This shaft has secured thereto a collar provided with four projections 335. When the finger 330 is in its locking position the finger 334 will lie just outside of the path of the projections on the shaft 133 but when the finger 330 has been moved out of its locking position to release the accumulator shaft the finger 334 will be moved into the path of the projections on the shaft 133. The next operation of the machine, which will actuate the shaft 133, will cause one of the projections to engage the arm 334 and move the same upward, thus moving the arm 330 toward the accumulator shaft and into its locking position. It will be noted that there are four of the projections 335 on the shaft 133. This is due to the fact that the shaft 133 moves through only three-fourths of a revolution on each operation of the machine. In order that there may always be one projection in operative relation to the finger 334 four of these projections are provided. A nose or pointed projection 336 is secured to the hub which carries the arms 330 and 334 and coöperates with a spring-pressed pawl 337 to retain the arms in their adjusted positions. It will be noted that the pawl has two notches either of which may receive the nose 336 and which will retain the nose and, consequently, the arms against movement until sufficient force has been applied thereto to overcome the pressure of the spring on the pawl.

The operation of the printing mechanism to print from the rear or totalizing counters is accomplished in the same manner as it is accomplished in the patent above referred to, that is, the shaft 173 is rotated by means of a hand wheel 338, as shown in Fig. 1. The rotation of the shaft to print from the front or detail counters or recording devices is in one direction while the rotation of the shaft to print from the rear or totalizing counters is in the opposite direction. The printing from the front or detail counters is accomplished automatically when the machine is operated to make a certificate and it is desirable that means should be provided to prevent the shaft being rotated in a direction to print from these counters by means of the hand wheel 338. A suitable lock is, therefore, provided which will normally hold the shaft against rotation is such direction but which will be released at the beginning of the operation of the automatic actuating device for the shaft. This lock as shown in the present form of the mechanism comprises a disk 339 rigidly secured to the printing shaft 173 and having therein a notch 340. Pivotally mounted on the frame of the machine adjacent to the disk 339 is a pawl 341 having one end arranged to enter the notch 340 and having secured thereto an arm 341ª extending into the path of the projection 342 secured to one side of the actuating segment 179. A spring 343 holds the pawl 341 normally in engagement with the notched disk 339 and thus locks the disk against movement in one direction while it is free to rotate in the opposite direction. The first portion of the movement of the segment 179 will cause a projection 342 to engage the arm 341 which is secured to the pawl and move the pawl out of the notch 340, this movement taking place before the teeth of the segment have meshed with the teeth of the mutilated gear 178. It may also be noted in this connection that the shaft 173 is provided with means for preventing its overthrow at the beginning of the printing operation, this means comprising a wide tooth 344 on the gear 178 having its outer surface curved to conform to the lower surface of an extension 345 on the segment 179. Consequently, as the segment completes its return movement the wide tooth 344 will engage the extension 345 and its movement will be checked before the segment has entirely cleared the gear.

The operation of the machine will be readily understood from the foregoing description and it will be apparent that a machine has been provided which will make a certificate and print a detail record thereof and which will accumulate and print total records of the items printed in the detail record. While the machine has been shown and described as adapted to issue certificates of deposit it will be understood that this particular form of certificate is adapted for the purpose of illustration only and that the invention is capable of adaptation for the making and recording of certificates and documents of various kinds, such as checks, bonds, stock certificates, statements and the like, and the term "certificate" as used in the specification and claims is intended to include all such equivalent documents.

It will likewise be understood that the manner in which the certificate is made may be varied materially from that herein shown without departing from the spirit of the invention. It is not necessary to the making of the certificate that the data should be printed thereon, but the material of which the certificate is to be formed may be marked in any suitable manner by devices of any suitable character and these markings may be arranged in blanks left on printed forms or in any other suitable manner, and any desired part of the markings or printed matter may be applied by the machine to the material of which the certificate is to be formed. It will also be understood that the mechanism herein shown and described can be altered and material changes made therein without departing from the spirit of the invention and that the invention is not to be limited to the specific details shown and described, for obvious modifications will occur to a person skilled in the art. For example, we wish it to be understood that the feeler mechanism herein shown is susceptible to various modifications in its organization and arrangement; and that various changes can be made both in the mechanism and in the character and arrangement of the openings in the certificate and the support therefor. It will also be understood that the term "certificate" as used broadly in the specification and claims is not to be construed as meaning the completed certificate but may mean the certificate-forming material at any state of its transformation from blank paper to the completed certificate, inclusive of both.

Having thus fully described the invention what is claimed as new and desired to be secured by Letters Patent, is:—

1. The combination, with devices for marking on certificate-forming material to make a certificate of any one of a plurality of denominations, which certificate has a denomination mark to indicate its value and a mark to identify the certificate, of devices for printing a record of the number of certificates issued of each denomination and of the identifying mark for each certificate.

2. The combination, with devices for marking on certificate-forming material to make a certificate of any one of a plurality of denominations, which certificate has a denomination mark to indicate its value and a mark to identify the person to whom the certificate is issued, of devices for printing a record of the number of certificates issued of each denomination and of the identifying mark for each certificate.

3. The combination, with devices for marking on certificate-forming material to make a certificate of any one of a plurality of denominations, which certificate has a denomination mark to indicate its value, a mark to identify the certificate, and a mark to identify the person to whom the certificate is issued, of devices to print a record of the number of certificates issued of each denomination and of both of said identifying marks.

4. The combination, with devices for marking on certificate-forming material to make a certificate of any one of a plurality of denominations, which certificate has a denomination mark to indicate its value, and a mark to identify the person to whom the certificate is issued, of devices to print a record of the denomination and identifying mark of each certificate and to compute and print a record of the number of certificates issued of each denomination.

5. The combination, with devices for marking on certificate-forming material to make a certificate of any one of a plurality of denominations, which certificate has a denomination mark to indicate its value, a mark to identify the certificate and a mark to identify the person to whom the certificate is issued, of devices to print a record of the denomination and identifying marks of each certificate issued and to compute and print a record of the number of certificates issued of each denomination.

6. The combination, with a certificate having a certificate-identifying mark, of a certificate-controlled device to provide said certificate with a mark to identify the person to whom it is issued, other certificate-controlled devices to make a record of said identifying marks and to make a record of the number and value of the certificates issued, actuating means common to both of said devices, and other devices to print a total record of the number and value of the certificates issued.

7. The combination, with a device for making a certificate of any one of a plurality of denominations, each of said certificates having an identifying mark, of mechanism operating automatically upon the making of each certificate to print a record of the denomination and the identifying mark of said certificate.

8. The combination, with a device for making a certificate of any one of a plurality of denominations, each of said certificates having an identifying mark, of mechanism operating automatically upon the making of each certificate to print a record of the denomination and the identifying mark of said certificate, and totalizing devices for computing and printing a record of the number of certificates of each denomination issued during a given period and of the total value of the certificates issued during such period.

9. The combination, with devices to make a certificate of any one of a plurality of denominations, said devices comprising means for marking each certificate to identify the person to whom it issues, of devices to make a record of the denomination and identifying marks of said certificate, and totalizing devices to make a record of the number of certificates of each denomination issued during a given period and of the sum of the denominations of all the certificates issued during such period.

10. The combination, with devices for marking on certificate-forming material to make a certificate which, when issued, constitutes an order for money and has a denomination mark to indicate its value, a certificate-identifying mark, and a mark to identify the person to whom it is issued, of devices to print a record of said marks and to print a record of the total number of certificates issued during a given period, the number of certificates of each denomination issued during that period and the sum of the denominations of the certificates issued during that period.

11. The combination, with devices for marking on certificate-forming material to make a certificate which, when issued, constitutes an order for money and has a denomination mark to indicate its value, a certificate-identifying mark, and a mark to identify the person to whom it is issued, of certificate-controlled devices to print a record of said marks of each certificate issued, to print a record of the total number of certificates of each denomination issued during a given period and to print a record of the sum of the denominations of all the certificates issued during that period.

12. In a machine of the character described, the combination, with printing mechanism to make a certificate of any one of a plurality of different denominations comprising two separate groups of printing devices, one group of said devices being adapted to print the certificate and the other group of said devices being adapted to print a duplicate of said certificate, and means for taking an impression simultaneously from both of said groups of printing devices, of other devices to record and print the data printed on said certificate and said duplicate by the first-mentioned group of printing devices.

13. In a machine of the character described, the combination, with printing mechanism to make a certificate of any one of a plurality of different denominations, comprising two separate groups of printing devices, one group of said devices being adapted to print the certificate and the other group of said devices being adapted to print a duplicate of said certificate, and means for taking an impression simultaneously from both of said groups of printing devices, of other printing devices to make a record of the matter printed on said certificate and said duplicate by the first-mentioned groups of printing devices and of the denomination of said certificate, and other printing devices to make a record of the total number of certificates issued during a given period and of the sum of the total denominations of said certificates.

14. In a machine of the character described, the combination, with devices to make a certificate of any one of a plurality of denominations, which when issued constitutes an order for money, said devices comprising two sets of printing devices, one of which is adapted to print on the certificate an identification of the person to whom the certificate is issued and the other of which is adapted to print said identification upon a duplicate of said certificate, said certificate and said duplicate each having thereon a certificate-identifying number, and other printing devices to print a record of the denomination of each certificate issued, the certificate-identifying number of each certificate and the identification of the party to whom each certificate is issued.

15. In a machine of the character described, the combination, with devices to make a certificate of any one of a plurality of denominations comprising two sets of printing devices, one of which is adapted to print on the certificate an identification of the party to whom it is issued and the other of which is adapted to print said identification upon a duplicate of said certificate, said certificate also having thereon an identifying number, other printing devices to print a record of the denomination of each certificate issued, the identifying number of each certificate and the identification of the party to whom each certificate is issued, other means for printing the total number of certificates issued during a given period, the number of certificates of each denomination issued during said period and the sum of the denominations of the several certificates issued during said period, and means for setting the corresponding printing devices of the several groups of printing devices in unison.

16. In a machine of the character described, certificate-making mechanism comprising two groups of type disks to print the same data on the certificate and on a duplicate thereof, each disk having a gear connected therewith, rack bars having teeth meshing with the gears of the corresponding disk of the two groups and also having other teeth, toothed segments meshing with the last-mentioned teeth of the respective bars, means for actuating said segments, a third group of type disks to print a record relating to each certificate, each disk having a gear connected therewith, toothed segments meshing with the gears of the respective disk of said third group, and connections between the toothed segments for the third group of disks and the corresponding toothed segments of the first-mentioned groups of disks.

17. In a machine of the character described, two groups of printing devices, each group comprising two series of alined type disks, each disk having a gear secured to one side thereof, said gears being arranged on the same side of the corresponding type disks of the two groups of printing devices and said gears being arranged on opposite sides of the corresponding type disks of the two series of disks comprising each group of printing devices, rack bars arranged between said type disks and meshing with the gears of the corresponding type disks of the two groups of printing devices, and means for actuating said bars to set said type disks in unison.

18. In a machine of the character described, a printing device comprising a plurality of type disks, means for independently setting said type disks comprising levers operatively connected with the respective disks, operating mechanism to cause an impression to be taken from said type disks, a rod extending beneath said levers, pivoted arms supporting said rod, a gear connected with said arms, a bell crank lever having on one arm a segment meshing with said gear, a shaft adapted to be rotated when the machine is operated, a finger carried by said shaft, and a projection carried by the other arm of said bell crank lever and arranged to be moved in one direction by said setting levers and in the other direction by the finger on said shaft.

19. In a machine of the character described, a plurality of printing devices, a track extending from the exterior of said machine to a point near said printing devices, a sheet carrier slidably mounted on said track to receive the sheet and carry it into printing position beneath said printing devices, and means to move said carrier transversely to the outer portion of said track to bring the several portions of the sheet on said carrier simultaneously into engagement with the respective printing devices.

20. In a machine of the character described, a printing device, a track extending from the exterior of the machine to a point near said printing device, a portion of said track being fixed and a portion thereof being movable toward and away from said printing device, and a sheet carrier slidably mounted on said track.

21. In a machine of the character described, a printing device, a sheet carrier movable bodily relatively to said printing device to carry a sheet as a whole into and out of printing position, a support for said sheet carrier arranged adjacent to said printing device, arms arranged substantially parallel with said support, pivotally mounted on fixed axes adjacent thereto and connected with said support and with one another, and means for actuating said arms to cause said support to be moved toward and away from said printing device.

22. In a machine of the character described, a printing device, a track, a portion of said track near said printing device being movable relatively to said printing device, a sheet carrier slidably mounted on said track and adapted to be moved onto and off the movable portion thereof, an operating device, and a connection between said operating device and said movable portion of said track to cause the latter to move toward and away from said printing device.

23. In a machine of the character described, certificate-making mechanism comprising printing devices, recording mechanism also comprising printing devices, said mechanisms being arranged one above the other and spaced apart to form a recess between them, connections between said mechanisms to cause them to print the same item, a sheet carrier movably supported adjacent to said recess and adapted to be moved into and out of the same, and means for causing the printing devices of said certificate-making mechanism to act on the sheet on said carrier while the latter is in said recess.

24. In a machine of the character described, certificate-making mechanism comprising printing devices, recording mechanism also comprising printing devices, said mechanisms being arranged one above the other and spaced apart to form a recess between them, connections between said mechanisms to cause them to print the same item, a sheet carrier movably supported adjacent to said recess and adapted to be moved into and out of the same, and means to move said sheet carrier toward and away from the printing devices of said certificate-making mechanism.

25. In a machine of the character described, the combination, with mechanism for making a certificate of any one of a plurality of denominations, of a device to print a record of the denomination of each certificate issued, and a device to compute and print the number of certificates issued of each denomination and the sum of the denominations of the certificates of the same or different denominations issued during a given period of time.

26. In a machine of the character described, the combination, with mechanism for making a certificate of any one of a plurality of denominations, said certificate having a mark to indicate its value, and a mark to identify the certificate, and mechanism for supplying said certificate with data before it is issued, of means to print a record of the denomination of each certificate issued and the identifying mark of that certificate, and other devices to compute and print the value of a plurality of certificates of different denominations.

27. In a machine of the character described, the combination with certificate making devices, devices to make a record relating to said certificate, and means to support the material in a position to be acted upon by said certificate-making devices, of means to control the operation of said printing devices, said means comprising a part coöperating with said material-supporting means and controlled by the presence or absence of certificate-forming material on said supporting means.

28. In a machine of the character described, the combination, with certificate making devices, devices to make a record relating to said certificate, and means to support the material in a position to be acted upon by said certificate-making devices, of means to control the operation of said printing devices, said means comprising a part coöperating with said material-supporting means and controlled by the presence or absence of certificate-forming material on said supporting means in proper position to be acted upon by said certificate-making devices.

29. In a machine of the character described, the combination, with certificate making devices and devices to make a record of said certificate, of means to prevent the operation of said record making devices when they are set to make a record that does not correspond with the certificate to be issued.

30. In a machine of the character described, the combination, with certificate making devices and devices to make a record relating to said certificate, of means to prevent the operation of said record-making devices when there is no certificate-forming material in a position to be acted upon by said certificate making devices or when said record making devices are set to make a record that does not correspond with the certificate to be issued.

31. In a machine of the character described, the combination, with certificate-making devices, devices to make a record relating to said certificate, and means to support the material in a position to be acted upon by said certificate-making devices, of means to prevent the operation of said recording devices, and a device coöperating with said supporting means and adapted to be actuated by certificate-forming material when in operative position on said supporting means to render said preventing devices inoperative.

32. In a machine of the character described, the combination, with certificate making devices, devices to make a record relating to said certificate, and means to operate said devices, of devices to lock said operating means against movement when there is no certificate forming material in position to be acted upon by said certificate making devices or when said record making devices are set to make a record that does not correspond with the certificate to be issued.

33. In a machine of the character described, the combination, with certificate-making devices, a support for certificate-forming material, a device to act upon the material on said support, devices to make a record relating to said certificate, and means to operate said record-making devices, of a lock to control the operation of said record-making devices, and controlling devices for said lock comprising a part movable in unison with said operating means and arranged to engage the material on said support to actuate said controlling device.

34. In a machine of the character described, the combination, with certificate-making devices, a support for the certificate-forming material, a device to act on the material on said support, and devices to make a record relating to said certificate, of a device to lock said record-making devices against movement, and a device having movement toward said support and comprising a part arranged to engage the certificate-forming material on said support to actuate said locking means.

35. In a machine of the character described, the combination, with certificate making devices, devices to make a record relating to said certificate, and means to support a sheet of material in position to be acted upon by said certificate-making devices, of a locking device for said record-making devices adapted to be moved into and out of operative position, actuating mechanism for said locking device, said actuating mechanism having a part arranged to engage the sheet of material on said support to interrupt the operation of said mechanism.

36. In a machine of the character described, the combination, with certificate-making devices and record making devices, and a support arranged to support the material in a position to be acted upon by said certificate-making devices and having an opening therein, of a lock to hold one of said devices against movement, and controlling mechanism for said lock comprising a feeler arranged on that side of the material opposite the opening in said material support and in alinement therewith.

37. In a machine of the character described, the combination, with certificate making devices, record making devices, operating mechanism for said certificate making devices and said record making devices, and a sheet support arranged to support a sheet of material in a position to be acted upon by said certificate making devices, said support having an opening therein, of a locking device for said operating mechanism, and controlling mechanism for said locking device comprising a feeler arranged in alinement with the opening in said sheet support.

38. In a machine of the character described, the combination, with certificate making devices, record making devices, mechanism to operate both of said devices, and a sheet support arranged to support a sheet of material in a position to be acted upon by said certificate making devices, said sheet support having an opening therein which may be closed by the sheet of material thereon, of a locking device for said operating mechanism, actuating mechanism for said locking device comprising a movable part, a feeler connected with said movable part and arranged in alinement with the opening in said sheet support, whereby the movement of said movable part will be interrupted by the sheet which closes said opening.

39. In a machine of the character described, the combination, with certificate making devices, record making devices, mechanism to operate both of said devices, and a sheet support arranged to support a sheet of material in a position to be acted upon by said certificate making devices, said sheet support having an opening therein which is closed by the sheet of material thereon, of a locking device for said operating mechanism, a pivoted arm connected with said locking device and also connected with a feeler arranged in alinement with the opening in said carrier, and means controlled by said operating mechanism to impart movement to said arm, whereby the downward movement of said feeler and the connected portion of said arm will be interrupted if said opening is closed by a sheet of material and will be uninterrupted if the opening is not so closed.

40. In a machine of the character described, the combination, with devices for making certificates of different denominations, and recording devices to record the denomination of the certificate made, means to set said recording devices, a sheet support adapted to support a sheet of material in position to be acted upon by said certificate making devices, and means for operating said recording devices, of a locking device for said operating mechanism, and actuating mechanism for said locking device controlled by the denomination of the certificate which is to be made.

41. In a machine of the character described, the combination, with certificate making devices, means to support a sheet of certificate forming material in a position to be acted upon by said certificate making devices, said sheet of material having an opening arranged in a position peculiar to the denomination of the certificate into which it is to be made, record making devices, and means to set said record making devices to cause them to record the denomination of the certificate made by said certificate making devices, and means to operate said recording devices to make said record, of locking devices to control the movement of said operating mechanism, a feeler operatively connected with said locking devices, means controlled by said setting means to move said feeler into alinement with the opening in said certificate forming material, and means controlled by the movement of said operating mechanism to move said feeler toward said certificate forming material.

42. In a machine of the character described, the combination, with certificate-making devices, recording devices, setting mechanism to set said recording devices to make the desired record, and operating mechanism for said recording devices, of locking devices for said operating mechanism, controlling mechanism for said locking devices comprising a feeler, means controlled by the setting mechanism for said recording devices to move said feeler into different positions, each position corresponding with the particular record to be made by said recording devices, a sheet of certificate forming material supported in a position to be acted upon by said certificate making devices and having an opening which will be in alinement with said feeler when said certificate corresponds to the record which said recording devices are set to make, and means controlled by the movement of said operating mechanism to move said feeler toward said sheet of material.

43. In a machine of the character described, the combination, with certificate-making devices, a sheet support to receive sheets of certificate-forming material, said sheets being adapted to form certificates of different denominations and each sheet having an opening in a position peculiar to the certificate into which it is to be made, recording devices, and means to set said recording devices to record the denomination of said certificate, operating mechanism for said recording devices, locking devices for said operating mechanism, actuating mechanism for said locking devices comprising a feeler mechanism controlled by said setting means to move said feeler into different positions with relation to said certificate-forming material, each position corresponding to a denomination, thereby moving said feeler into alinement with the opening in said certificate-forming material when the denomination said recording devices are set to record corresponds to the denomination of the certificate which is to be made, and a yielding device for moving said feeler toward said certificate-forming material.

44. In a machine of the character described, the combination, with a certificate having an opening therein, of recording devices, means for setting the same, operating mechanism therefor, a locking device for said operating mechanism, controlling mechanism for said locking device comprising a feeler, means controlled by said setting mechanism to move said feeler with relation to said certificate, and means controlled by said operating mechanism to move said feeler toward said certificate.

45. In a machine of the character described, the combination, with certificate-making devices, recording devices, and locking devices to control the movement of said recording devices, of controlling mechanism for said locking devices comprising a feeler, means actuated in unison with the operation of said recording devices to actuate said feeler, and means controlled by the movement of said feeler to actuate said locking devices.

46. In a machine of the character described, the combination, with certificate-making devices, a support for a sheet of certificate-forming material having an opening therein to register with an opening in said certificate, a recording device, operating mechanism therefor, and a locking device for said operating mechanism, of a feeler, means to move said feeler relatively to the opening in said certificate, means controlled by said operating mechanism to move said feeler toward said certificate, and means controlled by the movement of said feeler for actuating said locking devices.

47. In a machine of the character described, the combination, with certificate-making devices, a support for a sheet of certificate-forming material having an opening therein to register with an opening in said sheet, recording devices, means to set said recording devices, operating mechanism for said recording devices, and locking devices for said recording devices, of a feeler operatively connected with said locking devices, means for moving said feeler into and out of alinement with said opening in said support, a cam operated in unison with said supporting mechanism, and a resilient connection between said cam and said feeler.

48. In a machine of the character described, the combination, with certificate-making devices, a support for a sheet of certificate-forming material having an opening therein to register with an opening in said sheet, recording devices, means to set said recording devices, operating mechanism for said recording devices, and locking devices for said recording devices, of a feeler operatively connected with said locking devices, means for moving said feeler into and out of alinement with said opening in said support, a cam operated in unison with said supporting mechanism, a resilient connection between said cam and said feeler, a shaft extending substantially parallel with said sheet support, an arm pivotally and slidably mounted on said shaft, and operatively connected with said locking devices, a feeler carried by said arm, a cam operatively connected with the operating mechanism for said recording device, an arm actuated by said cam, and a resilient connection between said arm and the first-mentioned arm, whereby the movement of said cam will move said feeler toward said support.

49. In a machine of the character described, the combination, with certificate-making devices, a sheet support having two openings therein and adapted to receive a sheet having an opening to register with one of said openings in said support, recording devices, setting mechanism, and operating mechanism for said recording devices, of a locking device normally in a position to lock said operating mechanism against movement, a second locking device normally in an inoperative position with relation to said operating device, separate controlling devices for said locks, each comprising a feeler, means for moving said feeler toward said support, one of said feelers being arranged in alinement with that opening in said support adapted to register with the opening in the sheet and the other of said feelers being arranged in alinement with the other opening in said support.

50. In a machine of the character described, the combination, with certificate-making devices, recording devices comprising a device to print the denomination of the certificate issued, total cash adders to compute and print the total amount for which certificates have been issued, actuating mechanism for said total cash adders, and a single setting mechanism to set said denomination printing device and to set said actuating mechanism to cause a number of units equal to the denomination of said certificate to be added to said total cash adders.

51. In a machine of the character described, certificate-making devices, a denomination printing device, mechanism for setting the same, total cash counters, a plurality of actuators for said total cash counters, and means controlled by said setting mechanism to move one of said actuators into operative relation with said total cash counters.

52. In a machine of the character described, a denomination printing device, mechanism for setting the same, a total cash counter comprising a series of counter wheels, a series of actuating devices for said counter wheels, means controlled in unison with the setting mechanism for said denomination printing device to move one of said actuating devices into operative relation with one of the counter wheels of said total cash counter, and means to operate said actuating devices.

53. The combination, with counting mechanism comprising a series of counter wheels, and gears connected with the respective counter wheels, of a series of independently rotatable actuators, means for moving said actuators in unison to bring a selected one of them into operative relation with the gear of one of said counter wheels, and means to rotate that actuator which is in operative relation with the gear of one of said counter wheels to cause it to engage said gear and actuate said counter wheel.

54. In a machine of the character described, the combination, with a plurality of counter wheels, each having a gear, of a plurality of actuators, means to move a selected one of said actuators into operative relation with the gear of any one of a plurality of said counter wheels, and means for operating that actuator which is in operative relation with the gear of one of said counter wheels to cause it to engage said gear and actuate said counter wheel.

55. In a machine of the character described, the combination, with certificate-making devices, denomination printing devices, and means for setting said denomination printing devices, of a total cash counter comprising a series of counter wheels secured thereto, a series of actuators, each of which is adapted to be moved into operative relation with the gear of any one of a plurality of said counter wheels, means controlled in unison with said setting mechanism to impart setting movement to said actuators, and means to operate that one of said actuators which is in operative relation with the gear of one of said counter wheels.

56. In a machine of the character described, the combination, with certificate-making devices, denomination printing devices, and means for setting said denomination printing devices, of a total cash counter comprising a series of counter wheels, each having a gear, operating mechanism comprising a series of actuators, means controlled in unison with said setting mechanism to move one of said actuators into operative relation with the gear of one of said counter wheels, means to actuate that one of said counters which is in operative relation with the gear of said counter wheel, and means to lock the other of said actuators against movement.

57. In a machine of the character described, the combination, with certificate-making devices and recording devices, a feeler controlled locking device for said recording devices, and operating mechanism for said recording devices, of a ratchet operatively connected with said operating mechanism, a pawl adapted to engage said ratchet and hold said operating mechanism against rearward movement, said pawl having a smooth portion to prevent said operating machanism being locked against rearward movement until said feeler has operated.

58. In a machine of the character described, the combination, with certificate-making devices and recording devices, and operating mechanism for said recording devices, of a ratchet connected with said operating mechanism, a pawl carried by said ratchet and having a lip, a stop arranged adjacent to said ratchet, and a cam connected with said ratchet to move the lip of said pawl into position to engage said stop.

59. In a machine of the character described, a recording device, an impression device to take a record from said recording device, an operating device to actuate said impression device, a lock to hold said impression device against movement, and means controlled by said operating device to automatically actuate said lock to release said impression device.

60. In a machine of the character described, a recording device, an impression device to take a record from said recording device and comprising a rotatable shaft, a locking member carried by said shaft, a cooperating locking member movably mounted on said machine, an operating device to actuate said impression device, and means actuated by said actuating member to disengage said locking members.

61. In a machine of the character described, a recording device, printing mechanism to take a record from said recording device comprising a rotatable shaft, a locking member carried by said shaft, a cooperating locking member mounted in said machine and held normally in engagement with the first-mentioned locking member, a gear carried by said shaft, an operating device to actuate said printing mechanism comprising a segment adapted to engage said gear, and means actuated by the movement of said segment to disengage said coöperating locking devices before said segment engages said gear.

62. In a machine of the character described, a certificate-forming device, a recording device, printing mechanism to take a record from said recording device comprising a rotatable shaft, a disk secured to said shaft and having a recess therein, a spring-pressed lever mounted on said machine having a part adapted to enter the recess in said disk, a gear secured to said shaft, an operating device comprising an arm having a segment adapted to engage the gear on said shaft, an arm secured to said locking lever, and a part carried by the first-mentioned arm to move the locking lever out of engagement with said disk before said segment engages said gear.

63. In a machine of the character described, a recording device, printing mechanism to take a record from said recording device comprising a rotatable shaft, a locking member carried by said shaft, a cooperating locking member mounted in said machine and held normally in engagement with the first-mentioned locking member, a gear carried by said shaft, an operating device to actuate said printing mechanism comprising a segment adapted to engage said gear, and means actuated by the movement of said segment to disengage said coöperating locking devices before said segment engages said gear, said gear and said segment having coöperating surfaces to check the movement of said gear when the toothed portion of said segment moves out of engagement therewith.

In testimony whereof, we affix our signatures in presence of two witnesses.

WILFRED I. OHMER.
JOHN E. McALLISTER.

Witnesses:
TRACY G. WHISTLER,
J. W. AIKMAN.

Copies of this patent may be obtained for five cents each, by addressing the "Commissioner of Patents, Washington, D. C."